US011554627B2

(12) United States Patent
Lynn

(10) Patent No.: US 11,554,627 B2
(45) Date of Patent: Jan. 17, 2023

(54) VEHICLE HEIGHT CONTROL SYSTEM

(71) Applicant: Stephen Ray Lynn, Mena, AR (US)

(72) Inventor: Stephen Ray Lynn, Mena, AR (US)

( * ) Notice: Subject to any disclaimer, the term of this patent is extended or adjusted under 35 U.S.C. 154(b) by 78 days.

(21) Appl. No.: 17/348,641

(22) Filed: Jun. 15, 2021

(65) Prior Publication Data
US 2022/0396114 A1    Dec. 15, 2022

(51) Int. Cl.
*B60G 17/056*    (2006.01)
*B60G 11/27*    (2006.01)
*B60G 17/04*    (2006.01)

(52) U.S. Cl.
CPC .......... *B60G 17/0565* (2013.01); *B60G 11/27* (2013.01); *B60G 17/0408* (2013.01); *B60G 2202/152* (2013.01); *B60G 2300/02* (2013.01); *B60G 2500/324* (2013.01)

(58) Field of Classification Search
CPC .. B60G 17/04; B60G 2202/152; B60G 11/27; B60G 17/0565
See application file for complete search history.

(56) References Cited

U.S. PATENT DOCUMENTS

| | | | |
|---|---|---|---|
| 3,074,739 A * | 1/1963 | Alfieri ................... | B60G 17/04 |
| | | | 280/43.23 |
| 3,078,104 A | 2/1963 | Chalmers | |
| 3,140,880 A | 7/1964 | Masser | |
| 3,689,103 A * | 9/1972 | Meulendyk ............ | B60G 17/04 |
| | | | 180/41 |
| 4,279,430 A | 7/1981 | Tagg et al. | |
| 4,335,901 A * | 6/1982 | Gladish .................. | B60G 17/04 |
| | | | 280/6.151 |
| 4,865,349 A | 9/1989 | Church, Jr. | |
| (Continued) | | | |

FOREIGN PATENT DOCUMENTS

| | | | |
|---|---|---|---|
| ES | 2277765 | 7/2007 | |
| KR | 102341216 B1 * | 12/2021 | ........... B60G 17/052 |
| (Continued) | | | |

OTHER PUBLICATIONS

Martin, "How to Install a Rear Over-Inflate," 10-4 Magazine, Dec. 1, 2017, https://www.tenfourmagazine.com/2017/12/do-it-yourself/how-to-install-a-rear-over-inflate/.

*Primary Examiner* — Paul N Dickson
*Assistant Examiner* — Maxwell L Meshaka
(74) *Attorney, Agent, or Firm* — Bailey & Campany P.A.; Drew Bailey

(57) ABSTRACT

A vehicle height control system and method of increasing a vehicle height of a vehicle having a vehicle body and at least one axle assembly. The vehicle height control system includes a pressurized fluid, and a plurality of air springs provided to support at least one section of the body of the vehicle above at least one axle of the vehicle and configured to adjust the height the vehicle relative to the ground in response to the supply and discharge of the fluid. A control assembly of the vehicle height control system configured to receive user input indicative of a vehicle height adjustment operation desired by a user has a piston unit fluidically interconnected with the pressurized fluid supply system via a first control valve and is operable to adjust the vehicle height by adjusting a second control valve interposed between the pressurized fluid supply system and the air springs.

20 Claims, 8 Drawing Sheets

(56) References Cited

U.S. PATENT DOCUMENTS

| | | | |
|---|---|---|---|
| 5,016,912 A | 5/1991 | Smith et al. | |
| 5,344,189 A * | 9/1994 | Tanaka | B60G 17/0523 280/124.159 |
| 5,375,880 A | 12/1994 | Fleener et al. | |
| 5,752,798 A | 5/1998 | Smidler | |
| 6,470,248 B2 | 10/2002 | Shank et al. | |
| 7,121,185 B2 | 10/2006 | Alrefai | |
| 7,162,869 B2 | 1/2007 | Yoshino | |
| 7,240,911 B1 | 7/2007 | Escalante | |
| 7,441,781 B2 | 10/2008 | Luke | |
| 7,621,537 B2 | 11/2009 | Pierce et al. | |
| 7,690,663 B2 | 4/2010 | Haire | |
| 7,740,257 B2 * | 6/2010 | Haire | B60G 17/052 280/124.16 |
| 7,946,603 B2 | 5/2011 | Hammond | |
| 9,272,599 B1 | 3/2016 | Cook, Jr. et al. | |
| 9,346,357 B2 | 5/2016 | Roberts | |
| 9,630,469 B2 | 4/2017 | Leonard | |
| 9,758,007 B2 * | 9/2017 | Kondo | B60G 17/0565 |
| 9,926,994 B2 * | 3/2018 | Frank | F16F 9/02 |
| 9,975,392 B2 | 5/2018 | Ahmadian | |
| 11,034,205 B2 * | 6/2021 | Reuter | B60G 17/018 |
| 11,433,730 B2 * | 9/2022 | Kawai | B60G 17/0525 |
| 2013/0318954 A1 * | 12/2013 | Frank | F16F 9/02 60/407 |
| 2019/0111753 A1 * | 4/2019 | Reuter | B60G 17/0155 |
| 2019/0168565 A1 * | 6/2019 | Dolan | B60G 17/0525 |
| 2022/0032718 A1 * | 2/2022 | Kawai | B60G 17/0525 |
| 2022/0203801 A1 * | 6/2022 | Navarrete | B60G 17/08 |

FOREIGN PATENT DOCUMENTS

| | | |
|---|---|---|
| WO | WO 81/01984 A1 | 7/1981 |
| WO | WO 88/02327 A1 | 4/1988 |
| WO | WO 92/12021 A1 | 7/1992 |
| WO | WO 93/11953 A1 | 6/1993 |
| WO | WO 2013/000014 A1 | 1/2013 |
| WO | WO 2019/152082 A1 | 8/2019 |

* cited by examiner

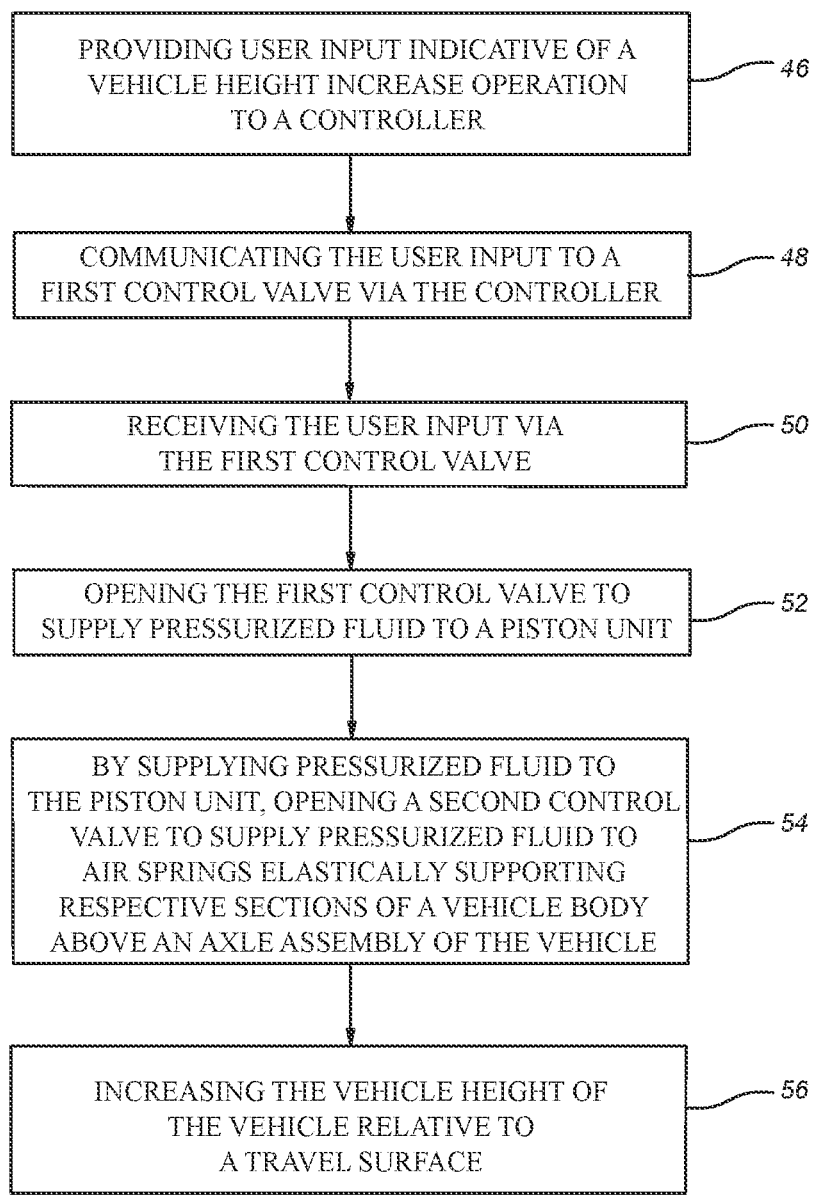

VEHICLE HEIGHT CONTROL SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND DISCUSSION

Fluid suspension systems including air springs have been implemented on vehicles widely throughout the transportation industry to enhance vehicle stability and provide a more comfortable riding experience. Additionally, various devices have been integrated with such fluid suspension systems so as to provide a system for adjusting the height of the vehicle using the air springs. Many of such systems, however, include components that easily damage, such as mechanical linkages, or require the user of the vehicle to exit the operation area of the vehicle to use the system, potentially inconveniencing the user, impeding traffic, and exposing the user to the risk of being injured by other vehicles.

Furthermore, such systems are commonly configured to merely maintain the vehicle at a standard vehicle height suitable for normal transportation purposes. From time to time, however, increasing the vehicle height above the standard vehicle height is desirable to avoid damaging the undercarriage of the vehicle on obstacles encountered when traveling or transitions to inclined surfaces. Indeed, such instances are common in the commercial trucking industry, particularly when transporting heavy objects. Trailers used to facilitate the hauling of such objects are commonly configured to have load-carrying platforms positioned a short distance above the surface beneath the vehicle. While such a configuration facilitates the loading of heavy objects, the undercarriage of the load-carrying platform of the trailer is susceptible to damage as a result of striking the ground surface or obstacles thereon. Supplying pressurized fluid to the air springs of a pressurized fluid suspension system to cause them to overinflate may increase the height of the vehicle, but continuously supplying pressurized fluid to the air springs may result in excessive overinflation that can damage the air springs and compromise user safety. It is, thus, desirable to have a durable vehicle height control system that can increase the height of the vehicle above its standard vehicle height and limit the amount of pressurized fluid supplied to the air springs. It is also desirable that such a vehicle height control system can be controlled from an area in which the user operates the vehicle.

SUMMARY

In a first aspect, the present invention is directed to a vehicle height control system. The vehicle height control system includes a pressurized fluid supply system configured to supply a pressurized fluid. The vehicle height control system also includes a plurality of air springs provided to elastically support at least one section of a vehicle body of a vehicle above at least one axle assembly of the vehicle and configured to adjust a vehicle height in response to the supply and discharge of the pressurized fluid. The vehicle height control system also includes a control assembly to allow the supply and discharge of the pressurized fluid to and from the air springs to be controlled based on user input received from a controller. The control assembly includes a piston unit, such as a pneumatic cylinder, fluidically interconnected with the pressurized fluid supply system via a first control valve. The piston unit is configured to extend and retract in response to the supply and discharge of the pressurized fluid supplied by the pressurized fluid supply system. The first control valve may be interposed between the pressurized fluid supply system and the piston unit such that the supply and discharge of the pressurized fluid to and from the piston unit can be controlled by opening and closing the first control valve based on user input provided to the controller. A second control valve is interposed between and fluidically interconnected with the air springs and the pressurized fluid supply system to facilitate control of the supply and discharge of the pressurized fluid to and from the air springs. The second control valve has a control member by which it may be opened and closed as appropriate to supply, discharge, and maintain the pressurized fluid to, from, and in the air springs. The piston unit is connected to the control member of the second control valve such that the second control valve may be opened and closed in response to the piston unit.

The vehicle height control system also includes a controller, located within an operation area of a primary vehicle, to control the supply and discharge of the pressurized fluid to and from the air springs by controlling the control assembly based on user input. In particular, the controller is in communication with the first control valve of the control assembly via signal transmission means such that various control signals corresponding to user input may be communicated to the first control valve. Upon receipt of and in response to the control signals, the first control valve is configured to open and close as appropriate to supply and discharge pressurized fluid to and from the piston unit, thereby inducing the extension and retraction of the piston unit to open and close the second control valve.

In a second aspect, the present invention is directed to a method of using the vehicle height control system of the present invention to increase a vehicle height of a vehicle relative to a ground surface. The method includes providing user input indicative of a vehicle height increase operation to the controller and communicating the user input to the first control valve. The method further includes receiving the user input via the first control valve, and based on the user input, said first control valve opening to supply a pressurized fluid to the piston unit. The method also includes opening the second control valve, by supplying the pressurized fluid to the piston unit, to supply the pressurized fluid to the air springs elastically supporting at least one section of the vehicle body above at least one axle assembly of the vehicle, and, by supplying the pressurized fluid to the air springs, increasing the vehicle height of the vehicle relative to the ground surface.

In a third aspect, the present invention is directed to a method of using the vehicle height control system of the present invention to increase a vehicle height of a subsidiary vehicle relative to a ground surface. The method includes providing user input indicative of a vehicle height increase operation to the controller and communicating the user input via the controller to a first control valve. The method further includes receiving the user input via the first control valve, and based on the user input, said first control valve opening to supply a pressurized fluid to the piston unit. The method also includes opening the second control valve, by supplying the pressurized fluid to the piston unit, to supply the pressurized fluid to the air springs elastically supporting at least one section of a primary vehicle body of the primary vehicle above at least one axle assembly of the primary vehicle, and, by supplying the pressurized fluid to the air springs, increasing the vehicle height of a subsidiary vehicle relative to the ground surface.

In a fourth aspect, the present invention is directed to a kit of parts for retrofitting the vehicle height control system of the present invention on a vehicle having an existing pressurized fluid suspension system with air springs. The kit of parts includes a piston unit to control an existing valve configured to control the flow of pressurized fluid to and from existing air springs of the existing pressurized fluid suspension system. The kit of parts also includes a control valve for controlling the supply and discharge of the pressurized fluid to and from the piston unit, a controller for receiving user input and controlling the control valve based on user input, and signal transmission means for communicably connecting the controller to the control valve. The kit of parts further includes connection means for connecting the piston unit to the existing valve and to an axle assembly of the vehicle, and conduit and fittings for fluidically interconnecting the piston unit with the existing pressurized fluid supply system via the control valve.

Upon consideration of the detailed description of the present invention that follows, the foregoing elements, functions, and advantages of the present invention will be better clarified and understood.

BRIEF DESCRIPTION OF THE DRAWINGS

FIG. 7A is a flowchart of a first exemplary vehicle height increase operation.

DETAILED DESCRIPTION

Figure 1:
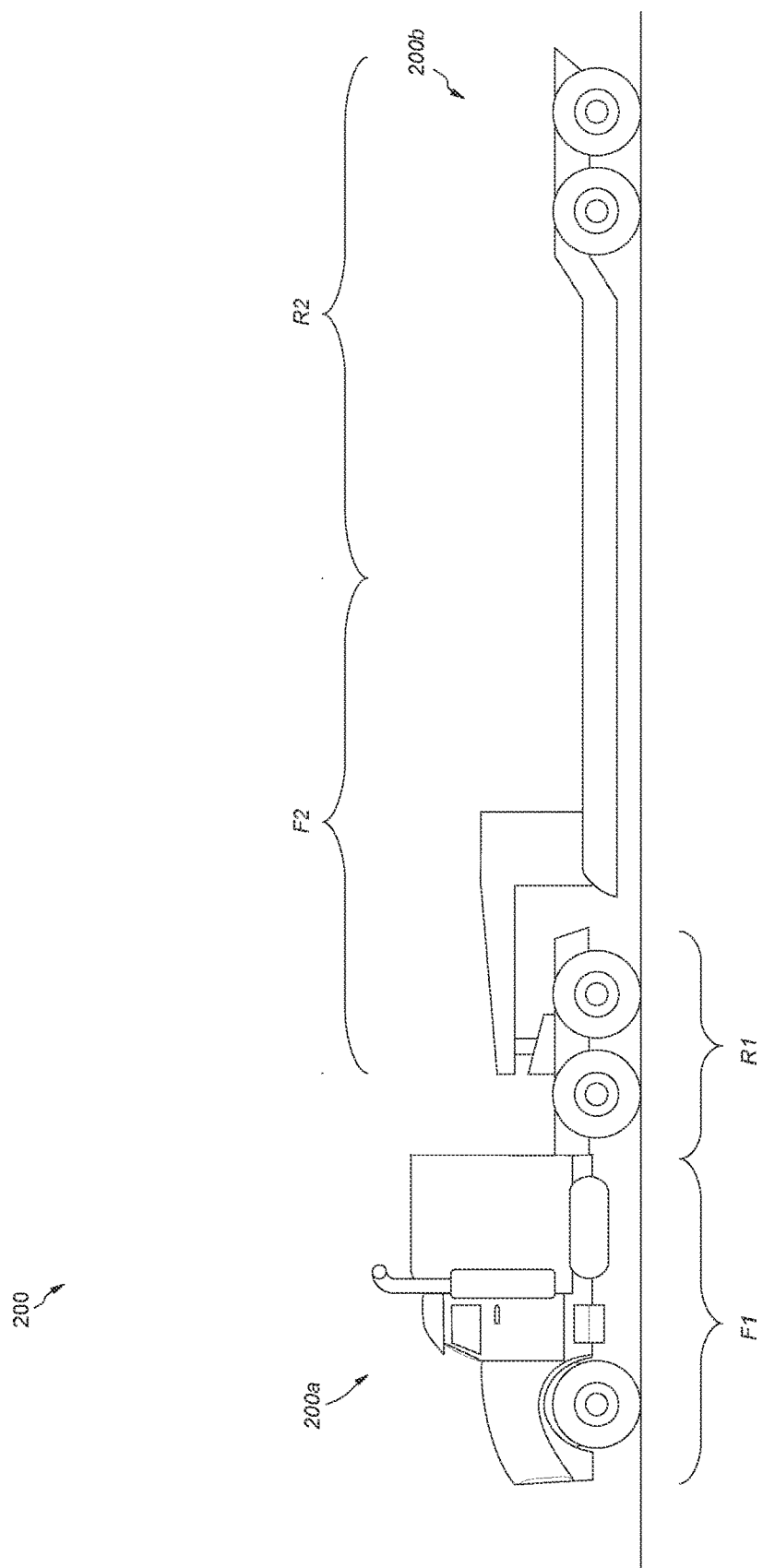
FIG. 1 is a side view diagrammatic illustration of an exemplary vehicle.

Various exemplary embodiments of an invention will be disclosed hereinafter with frequent reference to the drawings. For simplicity and clarity of illustration, elements indicated in the drawings are not necessarily drawn to scale, and reference labels have been repeated thereamong to indicate analogous elements. Each embodiment is disclosed for the purpose of enabling persons of ordinary skill in the art to appreciate and understand the principles and practices of the present invention. It is to be understood, however, that all of such embodiments are merely examples and not intended to limit the scope of the present invention.

The present invention is directed generally to a vehicle height control system 100. More specifically, the present invention is directed to a vehicle height control system 100 for selectively adjusting the height of a vehicle 200 relative to a ground surface. The vehicle height control system 100 of the present invention may be implemented on a vehicle 200. FIG. 1 illustrates an exemplary vehicle 200. Vehicle 200 may be any mobile machine that performs an operation associated with transportation on a ground surface, such as a road, highway, pathway, trail, a ground, or any other terrain. Vehicle 200 includes a primary vehicle 200a. Primary vehicle 200a may be any mobile machine that performs an operation associated with transportation on a ground surface, and that has means of independent propulsion. For example, primary vehicle 200a may be embodied by an automobile, semi-truck, tractor, all-terrain vehicle, or utility terrain vehicle. Vehicle 200 may also include a subsidiary vehicle 200b connected to primary vehicle 200a. Subsidiary vehicle 200b may be any mobile machine connected to primary vehicle 200a that is operable to facilitate transportation of a load on a ground surface, and is without means of independent propulsion. Subsidiary vehicle 200b may, for example, be embodied by a trailer connected to primary vehicle 200a.

Figure 3:
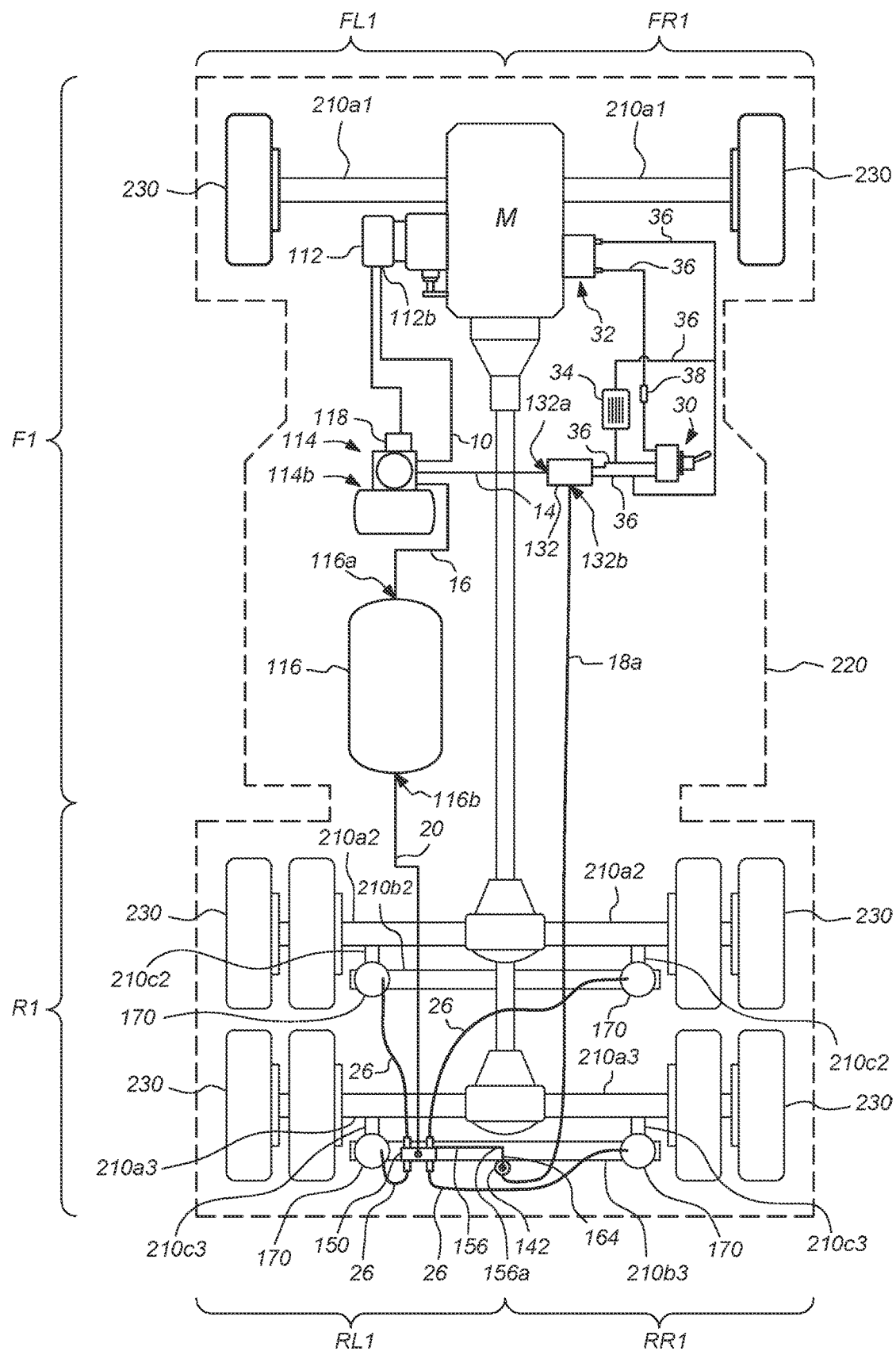
FIG. 3 is a plan view of an exemplary vehicle fitted with a vehicle height control system of an embodiment of the present invention.
Figure 4:
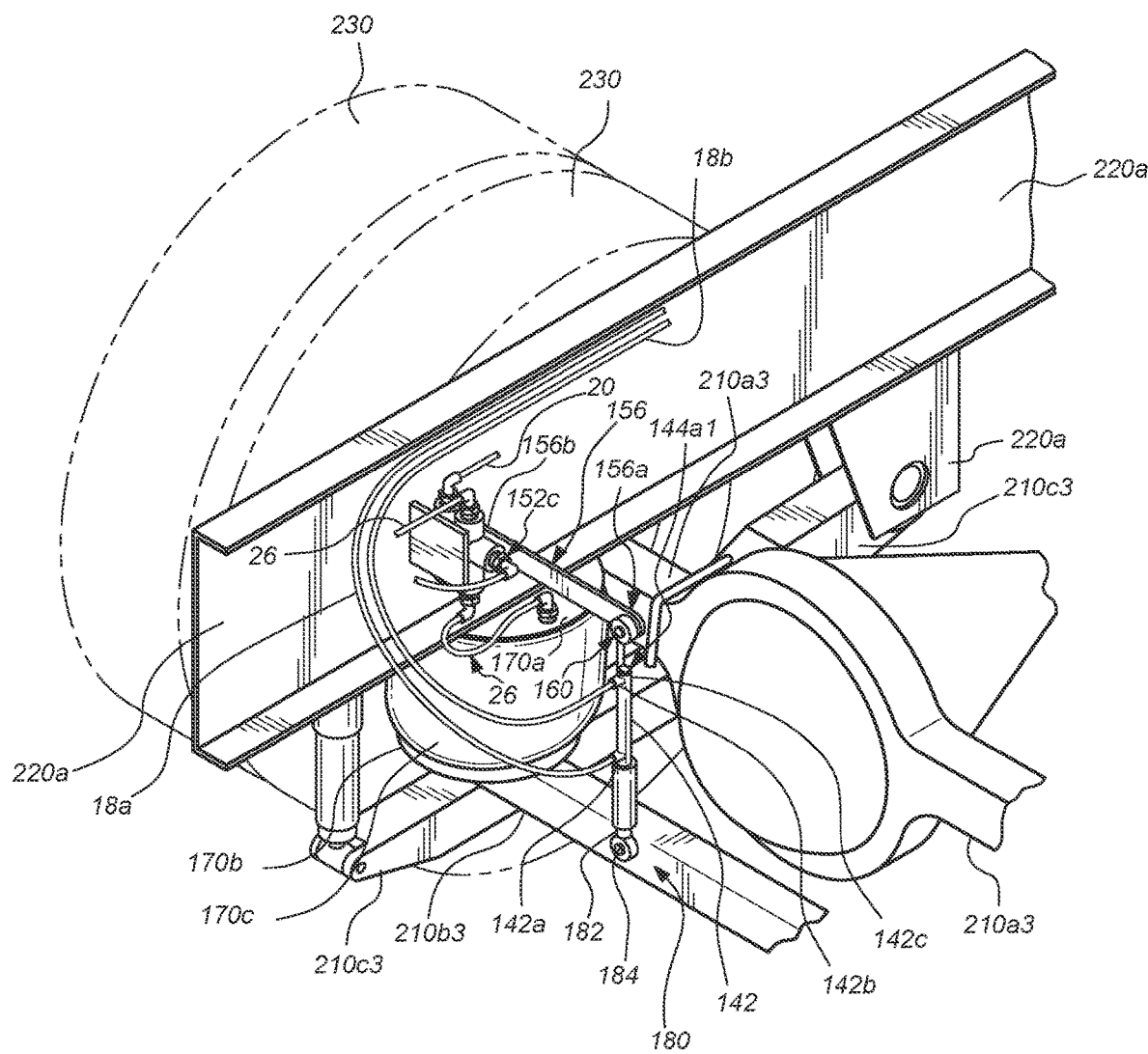
FIG. 4 is a fragmentary perspective view of an exemplary embodiment of the vehicle height control system in a state in which a standard vehicle height is maintained, showing an exemplary piston unit, connection means, control valve, air spring, conduits, and fittings.
Figure 5:
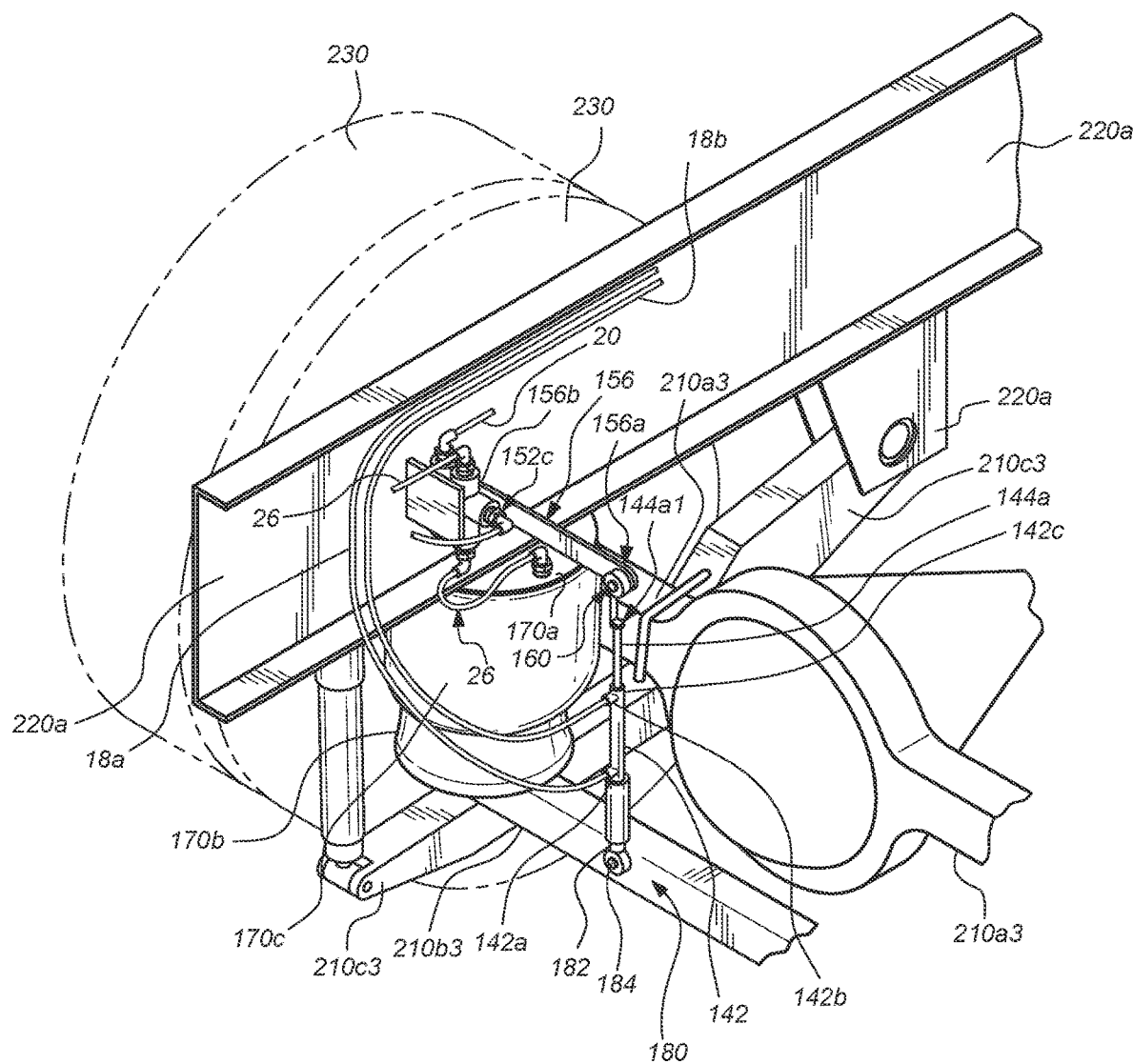
FIG. 5 is a fragmentary perspective view of an exemplary embodiment of the vehicle height control system in a state in which a target vehicle height is maintained, showing an exemplary piston unit, connection means, control valve, air spring, conduits, and fittings.

Vehicle 200 has at least one axle assembly 210 and at least one vehicle body 220. For purposes of describing the present invention, an axle assembly 210 of a vehicle 200 includes at least one axle 210a, and unsprung masses associated therewith, such as crossmembers 210b2, 210b3 and crossmember supports 210c2, 210c3 as shown in FIGS. 3, 4, and 5. Ground engaging elements 230, such as wheels or tracks, may be rotatably connected to each axle 210a of each axle assembly 210 to facilitate mobility of vehicle 200 on the ground surface. A vehicle body 220 of a vehicle 200 includes a primary vehicle body of a primary vehicle 200a, and, where applicable, a subsidiary vehicle body of a subsidiary vehicle 200b. A primary vehicle body includes at least one sprung mass of a main support structure 220a of primary vehicle 200a (e.g., a frame or chassis of primary vehicle 200a), and one or more other sprung masses associated with the main support structure 220a of primary vehicle 200a. A subsidiary vehicle body includes at least one sprung mass of a main support structure of subsidiary vehicle 200b (e.g., a frame or chassis of subsidiary vehicle 200b), and any other sprung masses associated with the main support structure of subsidiary vehicle 200b. Each of the primary vehicle body and the subsidiary vehicle body have a front section F1, F2 and a rear section R1, R2 opposite their respective front sections F1, F2, each of such sections F1, F2, R1, R2 further having a left section and a right section opposite the respective left section, as exemplified on the primary vehicle 200a of FIG. 3 by reference labels FL1, FR1, RL1, RR1. Axle assemblies 210 associated with a common section of the vehicle body 220 may further be referred to as an axle assembly of that section of the vehicle body 220. For example, as shown in FIG. 3, axles 210a2 and 210a3, and unsprung masses associated respectively therewith, commonly associate with a rear section R1 of a vehicle body 220 of an exemplary primary vehicle 200a, and may therefore be said to constitute a rear axle assembly 210 of the exemplary primary vehicle 200a of FIG. 3. Nonetheless, each of axles 210a2 and 210a3, and unsprung masses associated respectively therewith, may be referred to as an axle assembly 210 of the exemplary primary vehicle 200*a* indicated in FIG. 3.

The vehicle height control system 100 of the present invention may be implemented on a vehicle 200 such that it may be controlled to adjust the distance between the ground surface and any or all sections of the vehicle body 220 of the vehicle 200 (said distance between the vehicle body 220 and the ground surface may be referred to hereinafter as the "vehicle height"). In general, the vehicle height control system 100 comprises (a) a pressurized fluid supply system 110 configured to supply a pressurized fluid; (b) a plurality of air springs 170 provided to elastically support at least one section of the vehicle body 220 of vehicle 200 above at least one axle assembly 210 of vehicle 200 and configured to adjust the vehicle height of vehicle 200 in response to the supply and discharge of the pressurized fluid; (c) a control assembly 120 formed by a piston unit 140 fluidically interconnected with the pressurized fluid supply system 110 via a first control valve 130; (d) a second control valve 150 that is interposed between the pressurized fluid supply system 110 and air springs 170, and is configured to control the supply and discharge of the pressurized fluid to and from air springs 170 in response to the control assembly 120; and (e) a controller 30 configured to receive user input and adjust the vehicle height by controlling the control assembly 120 based on the user input. It is to be understood that the vehicle height control system 100 of the present invention may be implemented on a vehicle 200 such that components thereof are operably associated with the primary vehicle 200*a*, any subsidiary vehicle 200*b* connected to the primary vehicle 200*a*, or a combination thereof insofar as this specification does not expressly state, or the context does not clearly indicate, otherwise.

Air springs 170 are provided to elastically support at least one section of the vehicle body 220 above at least one axle assembly 210 of vehicle 200. Each air spring 170, for example, may be interposed in an upright position between a component of the vehicle body 220, and a component of at least one axle assembly 210 positioned beneath such component of the vehicle body 220. Subject to the structural limitations of a particular embodiment of vehicle 200, air springs 170 may be provided to elastically support any or all respective sections of the primary vehicle body and/or a subsidiary vehicle body of vehicle 200 so as to provide a desired degree of adjustability of the vehicle height. In one embodiment, for example, air springs 170 are interposed in an upright position between crossmembers 210*b*2, 210*b*3 of a rear axle assembly 210 of a primary vehicle 200*a* such that they elastically support rear left and right sections RR1, RL1 of a primary vehicle body respectively above the rear axle assembly 210 of the primary vehicle 200*a*.

Each air spring 170 is configured to adjust in height in response to the supply and discharge of a pressurized fluid. For example, each air spring 170 may include two end members 170*a* and 170*b*, and a tube or sleeve 170*c* made of elastomeric material (such as synthetic or natural rubber) secured between the two end members 170*a* and 170*b* so as to define an inner chamber. One or more of the two end members 170*a* and 170*b* of each air spring 170 may include a passage formed therein through which the pressurized fluid may be supplied to and discharged from the inner chamber of the air spring 170. Such supplying and discharging of the pressurized fluid to and from air springs 170 respectively displaces air springs 170 between vertically expanded and contracted states (hence, increasing and decreasing the height of air springs 170). The vehicle height with respect to each section of the vehicle body 220 elastically supported by an air spring 170 increases and decreases respectively in response to such increases and decreases of the height of air springs 170.

By controlling the supply and discharge of the pressurized fluid to and from air springs 170, the vehicle height may be maintained at a standard vehicle height (a vehicle-specific height designed for normal transportation operations via testing and the like), increased to and maintained at a target vehicle height (a height determined by testing and the like that is above the standard vehicle height), or decreased from the target vehicle height back to the standard vehicle height. In this regard, air springs 170 are sufficiently sized and elastic to expand and contract vertically such that the vehicle height can be adjusted to and between the standard vehicle height and the target vehicle height. The elastomeric material of which the tube or sleeve 170*c* is made is also sufficiently durable to withstand at least a normal operating pressure of the pressurized fluid (a pressure within a range of pressures determined via testing and the like to be suitable for performing operations of the vehicle height control system 100). For example, in one embodiment, the target vehicle height is at 4 inches above the standard vehicle height of the vehicle 200 with respect to the section(s) of the vehicle body 220 elastically supported above the axle assembly 210 by air springs 170, and air springs 170 are made of synthetic rubber adapted to withstand a normal operating pressure of about 120 psi to 150 psi and measure 15⅝ inches in height when expanded sufficiently to obtain the target vehicle height and 11½ inches in height when contracted sufficiently to obtain the standard vehicle height.

The vehicle height control system 100 also includes a pressurized fluid supply system 110 configured to supply and store a pressurized fluid. The pressurized fluid supply system 110 may include a compressor 112 powered by a motor, a drier unit 114 fluidically interconnected with compressor 112, and a pressurized fluid supply reservoir 116 fluidically interconnected with compressor 112 via drier unit 114. In the preferred embodiment, the pressurized fluid supply system 110 further includes a pressure regulator 118 provided and configured to purge pressurized fluid from the pressurized fluid supply system 110 when the pressure occurring therein exceeds a first predetermined pressure level (a level determined by testing and the like) and to discontinue such purging of the pressurized fluid once the pressure occurring within the pressurized fluid supply system 110 has been reduced to a second predetermined pressure level (a pressure level determined by testing and the like that may be equal to or less than the first predetermined pressure level). This cycle of purging, and resuming pressurization of, the fluid within the pressurized fluid supply system 110 may hereinafter be referred to as the "pressure regulator purge cycle." Components of the pressurized fluid supply system 110 may generally be mounted to the vehicle body 220 by any suitable means, such as chemical bonding agents (including adhesives), mechanical connectors (e.g., brackets, fasteners, and the like), and/or thermal bonding (such as melting and welding) with or without a separate bonding agent (e.g., a polymer with a low melting point).

Compressor 112 functions to facilitate pressurization of a fluid, such as air, nitrogen, or another compressible gas. Compressor 112 includes a pump disposed in a compressor body and powered by the motor M. Orifices 112*a*, 112*b* may be formed in one or more surfaces of compressor 112. When the motor M powering compressor 112 is activated, the pump of compressor 112 functions to suction in fluid from a fluid source (such as atmospheric air) through a filter 8 and a first orifice 112*a* in the compressor body and force the fluid through a second orifice 112b in the compressor body to other components fluidically interconnected with compressor 112. Control valves 150 and 130, and pressure regulator 118, may be fluidically interconnected with compressor 112 directly, or indirectly through components of the pressurized fluid supply system 110, in order to keep the pressurized fluid supply system 110 sufficiently sealed for the fluid to pressurize as additional fluid is forced in by compressor 112. Fluid suctioned in by compressor 112 may contain moisture, which can harm components of the vehicle height control system 100. Drier unit 114 may be fluidically interconnected with compressor 112 to remove moisture from the fluid before the fluid is introduced to other components of the vehicle height control system 100.

Drier unit 114 is configured to remove moisture from a fluid. Drier unit 114 includes a drier 114b disposed inside a drier unit body 114a made of a metal, alloy, or other material sufficiently durable to withstand the pressure occurring within the pressurized fluid supply system 110. Drier 114b includes a desiccant material for removing moisture from the fluid, such as silica, calcium chloride, calcium sulfate, aluminosilicate minerals, or another material with hydrophilic properties. Drier unit 114 may be fluidically interconnected with compressor 112 via a conduit 10, with one end of the conduit 10 being connected to the second orifice 112b of compressor 112 and the opposite end being connected to an orifice 114a1 formed in a surface of drier unit body 114a upstream from drier 114b. Fluid forced into the pressurized fluid supply system 110 by compressor 112 is thereby directed to drier unit 114, whereupon the fluid is directed through drier 114b in which the desiccant material removes moisture from the fluid. A main passage 12a may be formed inside drier unit body 114a downstream from drier 114b, and secondary passages 12b, 12c, 12d may be formed inside drier unit body 114a so as to branch off from the main passage 12a and extend to other orifices 114a2, 114a3, 114a4 formed in one or more surfaces of drier unit body 114a. Upon exiting drier 114b, the fluid may be directed through these passages 12a, 12b, 12c, 12d to such other orifices 114a2, 114a3, 114a4. Pressurized fluid supply reservoir 116, pressure regulator 118, and other components of the vehicle height control system 100, such as the control assembly 120, may be fluidically interconnected with compressor 112 via drier unit 114 by way of such other orifices 114a2, 114a3, 114a4 so as to receive fluid containing less moisture than that suctioned in from the fluid source by compressor 112. In the preferred embodiment, a check valve 114c may be interposed between drier 114b and pressure regulator 118 to prevent an undesired flow of the pressurized fluid between drier 114b and pressure regulator 118. It is contemplated that additional passages may be similarly formed in drier unit body 114a so as to branch off from the main passage 12a and extend to additional respective orifices to enable other components of the vehicle height control system 100 and/or a subsystem to fluidically interconnect with compressor 112 via drier unit 114.

Pressurized fluid supply reservoir 116 may be constituted by a container configured to store a supply of pressurized fluid. In this regard, pressurized fluid supply reservoir 116 has capacity and is made of a metal, alloy, or other material sufficient to withstand the pressure occurring within the pressurized fluid supply system 110. In one embodiment, for example, pressurized fluid supply reservoir 116 embodies a container made of aluminum sufficiently durable to store fluid pressurized to at least 150 psi and with a capacity sufficient to store approximately 20 gallons of a pressurized fluid. Pressurized fluid supply reservoir 116 may be fluidically interconnected with compressor 112 via drier unit 114. Referring to the exemplary embodiment of FIG. 2, in this regard, at least one orifice 116a formed in a surface of pressurized fluid supply reservoir 116 may be connected to one end of a conduit 16, and the opposite end of the conduit 16 may be connected to an orifice 114a2 of drier unit 114 downstream from drier 114b. As will be further explained hereinafter, air springs 170 may be fluidically interconnected with pressurized fluid supply reservoir 116 via control valve 150. In this regard, at least one other orifice 116b is formed in a surface of pressurized fluid supply reservoir 116. It is also contemplated that other orifices may be formed in pressurized fluid supply reservoir 116 such that other components may be fluidically interconnected with compressor 112 via pressurized fluid supply reservoir 116.

In operation, the pressurized fluid supply system 110 preferably functions to retain fluid suctioned and forced into it by compressor 112 until otherwise discharged discretionarily by the user (by, for example, executing a vehicle height adjustment operation, as will be explained hereinafter) or in accordance with the pressure regulator purge cycle to facilitate maintenance of a suitable operating pressure. As compressor 112 continues to force fluid into the pressurized fluid supply system 110, subject to the user's discretion and the pressure regulator purge cycle, the pressure within the pressurized fluid supply system 110 increases, thereby supplying pressurized fluid that can be used in operations of the vehicle height control system 100.

Air springs 170 are fluidically interconnected with the pressurized fluid supply system 110 via control valve 150. Control valve 150 may be constituted by a rotary valve or any other mechanically-actuable valve that functions to control the flow of pressurized fluid between the pressurized fluid supply system 110 and the air springs 170 in response to the control assembly 120 as described herein. Control valve 150, and its constituent elements hereinafter described, may be made of a metal, alloy, resin, or the like. In general, control valve 150 includes (a) a valve element 154 embedded inside a valve body 152 having orifices 152a, 152b, 152c formed in surfaces thereof, and (b) a control member 156 operably associated with valve element 154. Control valve 150 may be interposed between the pressurized fluid supply system 110 and air springs 170. More specifically, referring to the exemplary embodiment of FIG. 2, at least one orifice 152a of control valve 150 may be connected to the pressurized fluid supply system 110 via a conduit 20 (such orifice(s) of control valve 150 may be referred to as "supply orifice(s) 152a" of control valve 150), and at least other one orifice 152b of control valve 150 may be connected to air springs 170 via one or more conduit(s) 20, 24, 26, 28 (such orifice(s) of control valve 150 may be referred to as "air spring orifice(s) 152b" of control valve 150). At least one discharge orifice 152c of control valve 150 is adapted to be in fluid communication with the atmosphere directly, or indirectly through one or more other components.

Control valve 150 is configured to control the supply and discharge of a pressurized fluid to and from air springs 170 in response to the control assembly 120 of the vehicle height control system 100. In this respect, valve element 154 is movably embedded inside valve body 152, and control member 156 may be operably associated with valve element 154 such that adjusting control member 156 induces corresponding adjustment of valve element 154 relative to the supply, air spring, and discharge orifices 152a, 152b, 152c in valve body 152. For example, valve element 154 may embody a disk rotatably embedded inside valve body 152, and control member 156 may embody an elongated shaft, rod, plate, strip or the like having a first end 156a and a second end 156b opposite the first end 156a. The second end 156b of control member 156 may, for example, be connected to the disk of valve element 154 via connecting means 44 (such as one or more fastener(s) or the like) such that rotating control member 156 between various angular positions induces corresponding rotation of valve element 154 within valve body 152.

Various passages 22 may be formed within valve body 152 of control valve 150 between valve element 154 and the supply, discharge, and air spring orifices 152a, 152b, 152c to facilitate fluid communication therebetween. A plurality of passages may also be formed inside valve element 154 so as to pass through valve element 154 in a radial direction. A piston unit 140 of the control assembly 120 is operably associated with control member 156 such that control member 156 may be adjusted to and between various positions in response to adjustments of the piston unit 140 as will be more fully described hereinafter. By using the control assembly 120 to selectively adjust control member 156 to and between various positions, valve element 154 may be adjusted such that the passages therein are communicated selectively with the supply, discharge, and air spring orifices 152a, 152b, 152c in valve body 152 as appropriate to selectively supply and discharge the pressurized fluid to and from air springs 170. In particular, valve element 154 is configured to adjust to and between at least three positions relative to the supply, air spring, and discharge orifices 152a, 152b, 152c, each of such positions corresponding respectively to one of a closed state and various open states of control valve 150. It is to be understood that the number of orifices formed in valve body 152, and the configuration and arrangement of the passages formed inside valve element 154 and valve body 152, may vary among embodiments to facilitate cooperation with variations of other components of the vehicle height control system 100.

Figure 2:
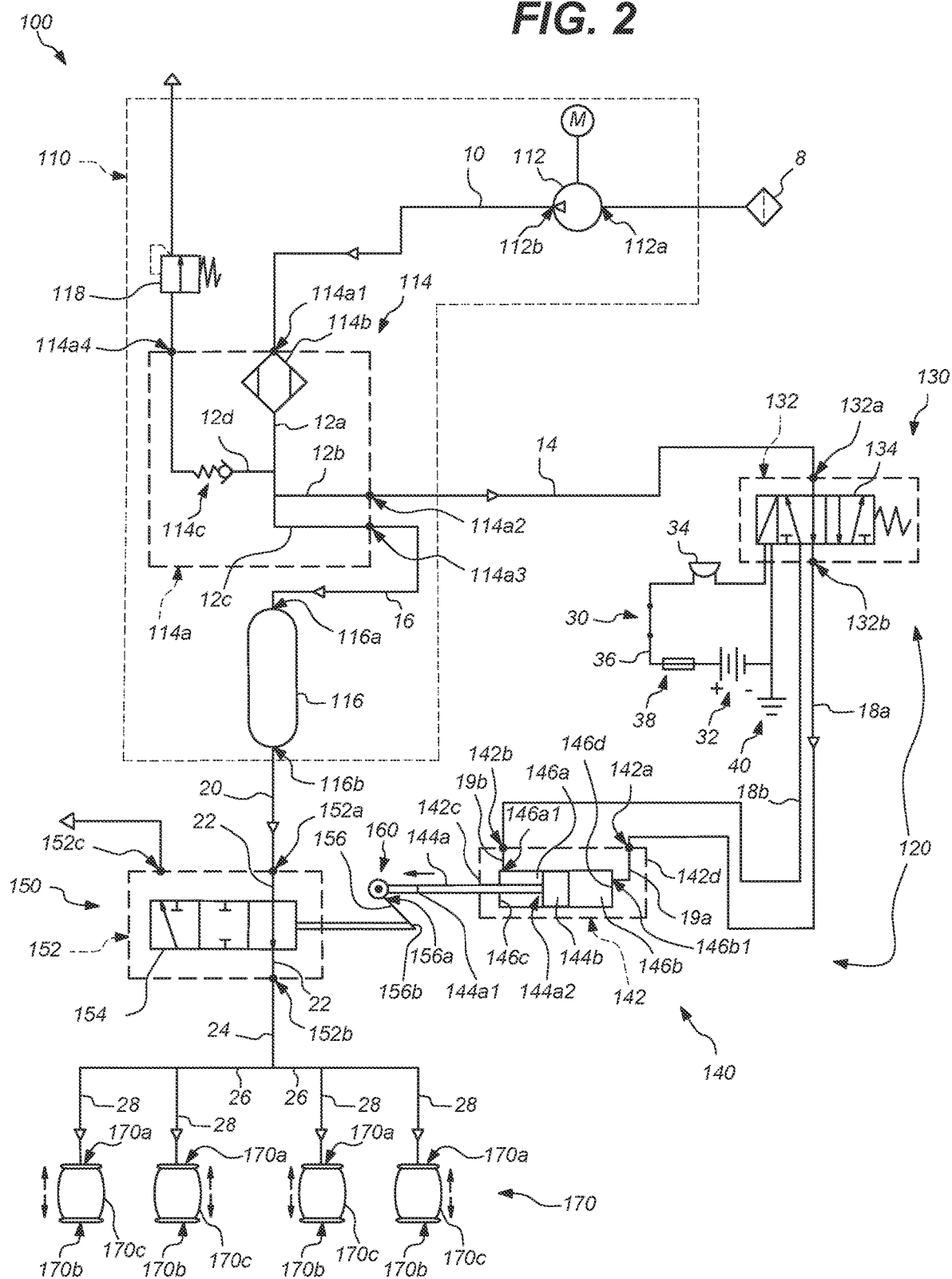
FIG. 2 is a schematic illustration of an exemplary embodiment of the vehicle height control system when performing a vehicle height increase operation.
Figure 6:
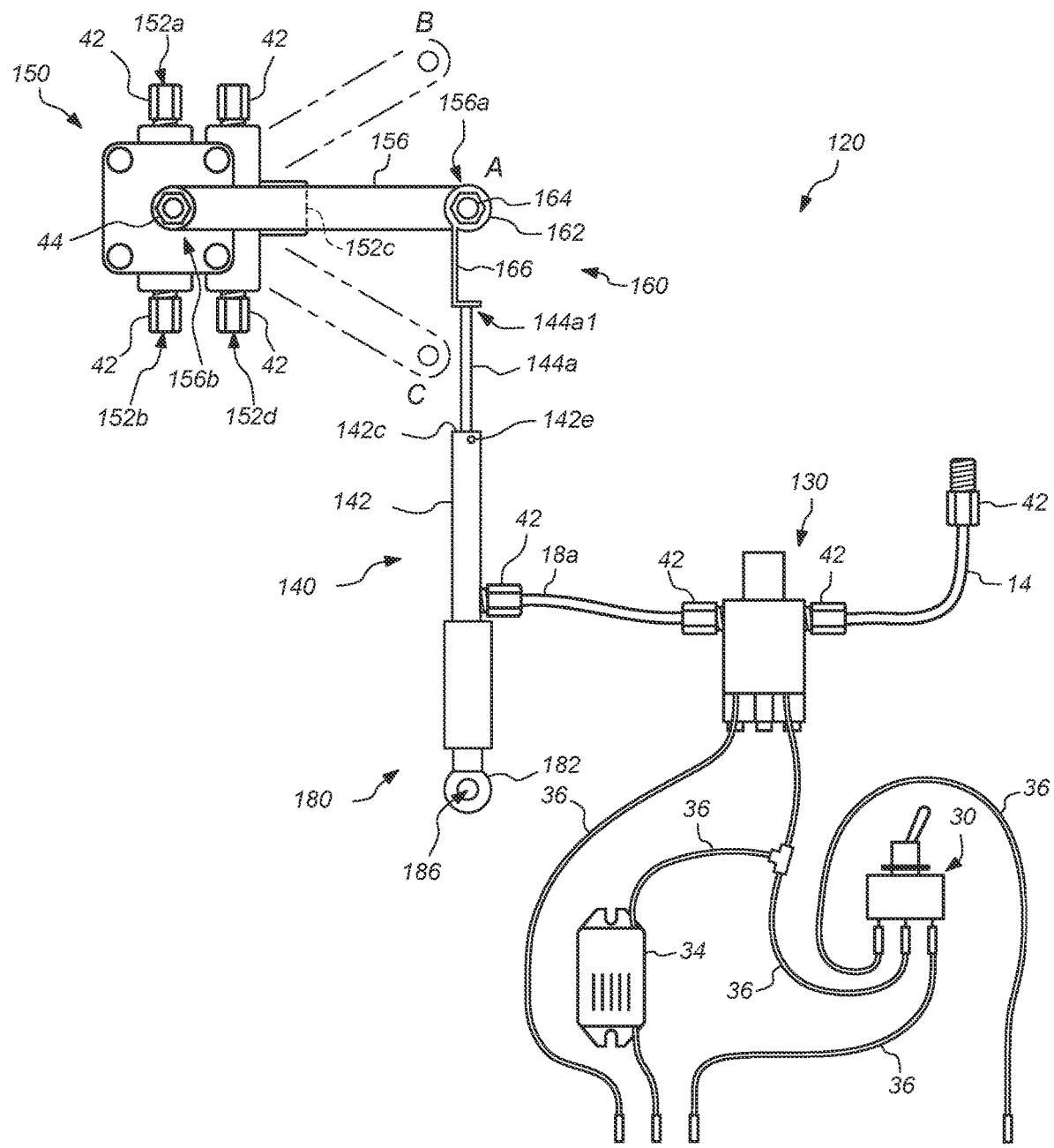
FIG. 6 is an elevational view of an exemplary embodiment of a kit of parts disclosed in the detailed description in association with a control valve and control member of an exemplary disclosed embodiment, with further illustration of alternative positions of the exemplary control member represented by broken lines.

For simplicity, the positions of control member 156 relative to the positions of valve element 154 and the states of control valve 150 will be more specifically described with reference to the exemplary embodiments of control valve 150 illustrated in FIGS. 2 and 6. FIG. 2 shows a schematic of an exemplary embodiment of control valve 150 showing exemplary positions of valve element 154, and FIG. 6 illustrates another exemplary embodiment of control valve 150 with indications of exemplary positions of control member 156 represented by broken lines. Referring now to FIGS. 2 and 6, in response to the control assembly 120 maintaining control member 156 in a position A, valve element 154 may be maintained in a first position that corresponds to a closed state of control valve 150. In its first position, valve element 154 is positioned such that none of the passages therein are in communication with the supply, air spring, and/or discharge orifice(s) 152a, 152b, 152c in valve body 152, thereby prohibiting the supply and discharge of pressurized fluid to and from air springs 170. By using the control assembly 120 to adjust the position of control member 156 in a first direction to a position B, valve element 154 may, however, be adjusted to a second position that corresponds to a first open state of control valve 150. In its second position (as illustrated in FIG. 2), valve element 154 is positioned such that one or more passages inside valve element 154 are in communication with the supply orifice(s) 152a and air spring orifice(s) 152b of control valve 150 so as to define or "open" a supply passage configuration passing through control valve 150 therebetween, allowing the pressurized fluid to be supplied to air springs 170 through control valve 150. By adjusting control member 156 in a second direction to a position C, valve element 154 may be adjusted to a third position that corresponds to a second open state of control valve 150. In its third position, valve element 154 is positioned such that one or more passages inside valve element 154 are in communication with the air spring orifice(s) 152b and discharge orifice(s) 152c of control valve 150 so as to define or "open" a discharge passage configuration extending through control valve 150 therebetween, allowing the pressurized fluid inside air springs 170 to discharge from air springs 170 through control valve 150.

Following an adjustment of control member 156 to position B or C, the vehicle height increases to the target vehicle height or decreases to the standard vehicle height respectively in response to pressurized fluid being supplied to or discharged from air springs 170. As the vehicle height increases to the target vehicle height or decreases to the standard vehicle height, control valve 150 is configured and positioned to gradually revert from one of its open states back to its closed state in response to the control assembly 120 applying a normal force to control member 156. Once the target vehicle height or the standard vehicle height is obtained and while such heights are maintained, control valve 150 is configured and positioned to be maintained in its closed state in response to the normal force of the control assembly 120 maintaining the position of control member 156, as exemplified in FIGS. 4 and 5. In this regard, control valve 150 may be mounted to the vehicle body 220 and/or an air spring 170 such that the distance between it and the ground surface correspondingly adjusts with the vehicle height. Control valve 150 is further mounted in a location on the vehicle body 220 and/or an air spring 170 sufficiently near a piston unit 140 of the control assembly 120 for control member 156 of control valve 150 to be adjusted to and between its various positions A, B, and C in response to adjustments of the control assembly 120. As illustrated in FIGS. 4 and 5, for example, control valve 150 may be mounted to the main support structure 220a of the vehicle body 220 positioned above an air spring 170 and oriented such that the first end 156a of control member 156 is positioned substantially above piston unit 140 of the control assembly 120.

The control assembly 120 includes a piston unit 140 configured to adjust in response to the supply and discharge of a pressurized fluid, and a control valve 130 configured to control the supply and discharge of the pressurized fluid to and from piston unit 140 based on user input received via a controller 30.

Control valve 130, and its constituent elements hereinafter described, may be made of a metal, alloy, resin or the like. Control valve 130 includes a valve element 134 embedded in a valve body 132 having orifices 132a, 132b, 132c formed in surfaces thereof. Valve element 134 may be movably embedded within valve body 132 between the orifices 132a, 132b, 132c and configured to adjust relative to the orifices 132a, 132b, 132c in response to user input received via controller 30. For example, control valve 130 may be embodied by a solenoid valve, wherein valve element 134 includes a solenoid, a spring adjacent to the solenoid, and a spool configured to reciprocate in response to biased forces applied by the solenoid and the spring. Controller 30 may, for example, be electrically connected to the solenoid of such exemplary control valve 130 and a power source 32 (such as a battery) such that based on various user input provided to a user interface of controller 30, signals in the form of increases and decreases of an electric current provided by the power source 32 can be selectively communicated to the solenoid via controller 30 to induce reciprocation of the spool. In alternative embodiments, control valve 130 may embody, for example, any electro-pneumatic valve, electro-mechanical valve, radio-controlled valve, electro-magnetic valve, or any other electronically-controlled valve configured to adjust in response to user input received via controller 30.

Control valve 130 is interposed between and fluidically interconnected with the pressurized fluid supply system 110 and piston unit 140. In one embodiment (illustrated in FIG. 2), for example, at least one orifice 132a of control valve 130 may be fluidically interconnected with an orifice of a component of the pressurized fluid supply system 110 via a conduit 14 and fittings 42 (such orifice(s) of control valve 130 may be referred to as "supply orifice(s) 132a" of control valve 130), and at least one other orifice 132b of control valve 130 may be fluidically interconnected with a first orifice 142a of piston unit 140 via a conduit 18a and fittings 42 (such orifice(s) of control valve 130 may be referred to as "piston unit orifice(s) 132b" of control valve 130). In addition to the aforementioned supply orifice(s) 132a and piston unit orifice(s) 132b of control valve 130, at least one discharge orifice 132c may be in fluid communication with the atmosphere directly or indirectly to discharge the pressurized fluid from inside piston unit 140 into the atmosphere through control valve 130, as will be more fully explained hereinafter.

Upon receiving user input, valve element 134 of control valve 130 is configured to adjust relative to the supply, piston unit, and discharge orifice(s) 132a, 132b, 132c of control valve 130 such that various passage configurations passing between such orifices 132a, 132b, 132c open and close in accordance with the user input to supply and discharge the pressurized fluid to and from piston unit 140. For example, as noted, valve element 134 may be embodied by a solenoid adjacent to a spring, and a spool configured to reciprocate in response to biased forces applied by the solenoid and the spring. In such exemplary embodiment, reciprocation of the spool induced by the receipt of various user input opens and closes at least one passage passing between supply and piston unit orifices 132a and 132b, and at least one passage passing between piston unit and discharge orifices 132b and 132c, in an alternating manner.

More specifically, upon control valve 130 receiving user input indicative of a vehicle height increase operation, valve element 134 is configured to adjust such that one or more passages between the supply orifice(s) 132a and a first piston unit orifice 132b open inside control valve 130 so as to define a supply passage configuration of control valve 130, whereby the pressurized fluid may flow from the pressurized fluid supply system 110 to piston unit 140 via control valve 130. Conversely, upon control valve 130 receiving user input indicative of a vehicle height decrease operation, valve element 134 is configured to adjust such that one or more passages between the first piston unit orifice 132b and the discharge orifice(s) 132c open inside control valve 130 so as to define a discharge passage configuration of control valve 130, whereby the pressurized fluid inside piston unit 140 may flow from piston unit 140 into the atmosphere via control valve 130. In one embodiment, a passage between the supply orifice(s) 132a and a second piston unit orifice 132c of control valve 130 may also be formed inside control valve 130 concurrently with the discharge passage configuration to direct pressurized fluid to piston unit 140 through a conduit 18b in a manner that facilitates the discharging of the pressurized fluid beneath a piston 144b of piston unit 140 to be described hereinafter.

By using controller 30 to selectively adjust valve element 134 so as to open and close the supply and discharge passage configurations of control valve 130, the user may selectively supply and discharge the pressurized fluid to and from piston unit 140 to adjust the effective length of piston unit 140.

Piston unit 140 is configured to extend and retract in response to the supply and discharge of a pressurized fluid. Piston unit 140, including its constituent elements hereinafter described, may be made of a metal, alloy, or other material sufficiently durable to withstand the pressure occurring within the control assembly 120 and to resist damage from debris encountered while traveling on various ground surfaces, such as concrete, gravel, dirt, or asphalt surfaces. Piston unit 140 may, for example, be made of stainless steel. In general, piston unit 140 includes a piston unit body 142 that defines an inner chamber 146, and a piston assembly 144 movably disposed substantially inside the inner chamber 146. Piston unit body 142 may embody an elongated structure defining an inner chamber 146, such as a hollow cylinder, and has a first end 142c and a second end 142d opposite the first end 142c. An opening may be formed in the first end 142c of piston unit body 142 through which a piston rod 144a of the piston assembly 144 may be slidably received. In addition, a venting aperture 142e may be formed in or near the first end 142c of piston unit body 142 so as to pass through piston unit body 142 into a first inner chamber 146a of piston unit 140 such that fluid therein may be discharged through the venting aperture 142e.

Piston assembly 144 includes a piston 144b movably and sealingly disposed inside the inner chamber 146 of piston unit body 142, and a piston rod 144a configured to extend outwardly from the first end 142c of piston unit body 142. Piston rod 144a may be connected to piston 144b and protrudes outward from piston 144b through the opening in the first end 142c of piston unit body 142. Piston rod 144a may be removably connected to piston 144b. For example, piston 144b may have an axial bore with internal threads, and piston rod 144a may have external threads that engage with the internal threads within the axial bore of piston 144b. Alternatively, piston rod 144a may be connected to piston 144b by any other suitable means, such as chemical bonding agents (including adhesives), mechanical connectors (e.g., brackets, fasteners, and the like), welding, and/or thermal bonding (such as melting and welding) with or without a separate bonding agent (e.g., a polymer with a low melting point).

As used herein, the term "piston" is not limited to a piston of circular or ovular cross-section, but also may include a piston with a cross-section of a multi-sided shape, such as a triangular, rectangular, or hexagonal cross-section. Piston 144b is disposed inside the inner chamber 146 of piston unit body 142 such that the inner chamber 146 is divided into a first inner chamber 146a above piston 144b and a second inner chamber 146b beneath piston 144b.

An imbalance between the forces acting on piston 144b from above and beneath piston 144b may induce corresponding displacement of piston 144b within the inner chamber 146 by which piston rod 144a may be extended and retracted from and within the inner chamber 146, respectively increasing and decreasing the effective length of piston unit 140. For example, a spring (not shown) may be disposed above piston 144b in the first inner chamber 146a to facilitate application of downward force on piston 144b. The second inner chamber 146b may have one or more orifice(s) 146b1 formed in a surface thereof at or substantially at the second end 146d of the inner chamber 146. A first passage 19a may be defined inside piston unit body 142 so as to pass through piston unit body 142 between the first orifice 142a of piston unit body 142 and an orifice 146b1 in the second inner chamber 146b. By providing user input indicative of a vehicle height increase operation to the user interface of controller 30, control valve 130 may be adjusted so as to direct the pressurized fluid into the second inner chamber 146b through this first passage 19a to apply pressure to piston 144b in excess of, and biased to, the forces acting downward on piston 144b (e.g., spring force, gravitational force, and weight forces of piston rod 144a and control member 156), displacing piston 144b toward the first end 146c of the inner chamber 146 and thereby extending piston rod 144a outward from the first end 142c of piston unit body 142. Conversely, by providing user input indicative of a vehicle height decrease operation to the user interface of controller 30, control valve 130 is adjusted so as to direct the pressurized fluid inside the second inner chamber 146b into the atmosphere such that the pressure inside the second inner chamber 146b reduces sufficiently to be overcome by the forces acting downward on piston 144b, thereby causing piston 144b to displace toward the second end 146d of the inner chamber 146 and piston rod 144a to retract substantially within the inner chamber 146.

In alternative embodiments, as illustrated in FIG. 2, a second passage 13 may be similarly defined inside piston unit body 142 so as to pass therethrough between a second orifice 142b in piston unit body 142 and an orifice 146a1 in the first inner chamber 146a. As an alternative or supplement to the aforesaid spring, alternative embodiments of control valve 130 that are implemented with such alternative embodiments of piston unit 140 may be adjusted to direct the pressurized fluid through this second passage 19b into the first inner chamber 146a to facilitate the discharge of the pressurized fluid from the second inner chamber 146b. It is further contemplated that additional orifices may be formed in piston unit body 142 and the inner chamber 146, and additional passages may be similarly defined so as to pass through piston unit body 142 between such additional orifices, to allow the pressurized fluid to be directed to the first and second inner chambers 146a and 146b as appropriate to further facilitate the extension and retraction of piston unit 140.

Piston unit 140 may be operably associated with control member 156 of control valve 150, and with an axle assembly 210 associated with one or more of air spring(s) 170, to facilitate the adjustability of control valve 150 in response to piston unit 140. More specifically, one of piston rod 144a and piston unit body 142 may be pivotally connected to control member 156 of control valve 150, and the other of piston rod 144a and piston unit body 142 may be fixedly connected to axle assembly 210.

A pivotal connection means 160 may be used to pivotally connect one of piston rod 144a and piston unit body 142 to control member 156 of control valve 150. In various embodiments, pivotal connection means 160 may include a pivotal connection assembly. As shown in FIGS. 4, 5, and 6, pivotal connection assembly may include a pivotal connection member 162, 166 and at least one pivotal connector 164. It is to be understood that the pivotal connection assembly may include additional pivotal connection components, such as one or more bearings and/or bushings. Pivotal connection means 160 may be made of a metal, alloy, polymer, or other material with sufficient stiffness and durability to support the operation of piston unit 140 in adjusting control valve 150 as described herein.

Pivotal connection member 162, 166 includes an eye member 162, and a stem 166 having a first end and a second end opposite the first end, as illustrated in FIGS. 4, 5, and 6. The stem 166 may, for example, embody a shaft, rod, strip or other elongated structure. The first end of the stem 166 may be connected to or contiguous with an outer surface of the eye member 162 such that the stem 166 protrudes outward from the eye member 162. The second end of the stem 166 may be adapted to connect to one of piston rod 144a and piston unit body 142 via any suitable means, including, for example, chemical bonding agents (including adhesives), mechanical connectors (e.g., brackets, fasteners, and the like), welding, and/or thermal bonding (such as melting and welding) with or without a separate bonding agent (e.g., a polymer with a low melting point). It is contemplated that various points located at spaced apart intervals along the length of the stem 166 may be adapted to removably connect to one of piston rod 144a and piston unit body 142 such that the distance between the eye member 162 and one of piston rod 144a and piston unit body 142 can be adjusted. Various aperture adapted to receive a mechanical fasteners, for example, may be formed in the stem 166 at spaced apart intervals along its length such that the stem 166 may be removably fastened to one of piston rod 144a and piston unit body 142 at any one of the various apertures. The eye member 162 of pivotal connection member 162, 166 is configured to rotatably engage with pivotal connector 164 directly, or indirectly through other pivotal connection components. For example, the eye member 162 may embody a ring or disk that defines an aperture in its center. Pivotal connector 164 may, for example, be a pin or other elongated structure with a sufficiently smooth and rounded exterior surface to be rotatably engaged within the aperture of the eye member 162. Alternatively, another pivotal connection component, such as a bearing, may be secured within the aperture of the eye member 162 such that pivotal connector 164 may be rotatably engaged within the eye member 162 indirectly through such pivotal connection component. An aperture may similarly be formed in a first end 156a of control member 156 so as to pass laterally through the first end 156a of control member 156. Pivotal connector 164 may likewise be rotatably engaged directly or indirectly within the aperture in the first end 156a of control member 156, thereby pivotally connecting control member 156 to one of piston rod 144a and piston unit body 140.

It is contemplated that in alternative embodiments, pivotal connection means 160 may embody other suitable means of pivotal connection, such as swivels, ball joints, or other articulating joints, adapted to connect to control member 156 and one of piston unit body 142 and piston rod 144a.

As illustrated in FIGS. 4 and 5, a fixed connection means 180 may be used to connect one of piston rod 144a and piston unit body 142 to axle assembly 210. Fixed connection means 180 may be embodied by a fixed connection assembly. The fixed connection assembly generally includes a fixed connection member 182 and at least one mechanical connector 184, such as a fastener, bracket, or a combination thereof. Fixed connection member 182 is configured to receive mechanical connector 184 and may be formed separately from piston unit 140 or as a unitary part of one of piston rod 144a and piston unit body 142. Fixed connection member 182, for example, may be embodied by a structure separate of piston unit 140 that defines an aperture 186 adapted to removably engage with mechanical connector 184; alternatively, one of the first end 144a1 of piston rod 144a and the second end 142d of piston unit body 142 may be adapted to define such aperture 186. When fixed connection member 182 is formed separately of piston unit 140, fixed connection member 182 may be removably or permanently connected to one of piston rod 144*a* and piston unit body 142 by any suitable means, including, for example, chemical bonding agents (including adhesives), mechanical connectors (e.g., brackets, fasteners, and the like), and/or thermal bonding (such as melting and welding) with or without a separate bonding agent (e.g., a polymer with a low melting point).

Mechanical connector 184 may be engaged with fixed connection member 182 to removably and fixedly connect piston unit 140 to axle assembly 210. For example, a bore with internal threads may be machined in a component of axle assembly 210, such as crossmember 210*b*. Mechanical connector 184 may embody, for example, a fastener (such as a bolt or the like) with external threads to engage with the internal threads within the bore machined in axle assembly 210. Mechanical connector 184 may be inserted through the aperture defined by fixed connection member 182, and advanced within the bore machined in axle assembly 210, such that piston unit 140 is removably and fixedly connected to axle assembly 210. It is contemplated that piston unit 140 may be associated with the axle assembly 210 by a chemical bonding agent or thermal bonding (such as welding or melting) with or without a separate bonding agent (e.g., a polymer with a low melting point). It is further contemplated that a bushing configured to engage with mechanical connector 184 may be provided within the aperture 186 to insulate the vibrations between fixed connection member 182 and mechanical connector 164.

In one embodiment, as illustrated in FIGS. 4 and 5, piston unit 140 is associated with crossmember 210*b* of the axle assembly 210 of vehicle 200 via fixed connection means 180 such that piston unit body 142 is secured to the axle assembly 210 in a fixed position and positioned substantially upright underneath the first end 156*a* of control member 156 to which it pivotally connects via pivotal connection means 160.

When the vehicle 200 is positioned at the standard vehicle height, piston unit 140 is in a retracted state in which piston 144*b* is positioned at the second end 146*d* of the inner chamber 146 of piston unit body 142. In its retracted state, piston unit 140 is preferably of a sufficient effective length to support control member 156 in position A (see FIGS. 4 and 6) such that control valve 150 is maintained in its closed state. Air springs 170 may be supplied with the pressurized fluid by increasing the effective length of piston unit 140 so as to adjust control member 156 to position B (see FIG. 6). As noted, pressurized fluid may be supplied to piston unit 140 to induce the extension of piston rod 144*a*, which increases the effective length of piston unit 140. Piston unit 140 is configured to increase in effective length until its extended state is obtained upon piston 144*b* reaching the first end 146*c* of the inner chamber 146 of piston unit body 142. In its extended state, piston unit 140 is preferably of a sufficient effective length to adjust control member 156 to position B when the vehicle 200 is positioned at the standard vehicle height and support the control member 156 in position A when the vehicle 200 is positioned at the target vehicle height (see FIG. 5). To revert the vehicle 200 from the target vehicle height to the standard vehicle height, the pressurized fluid may be discharged from air springs 170 by decreasing the effective length of piston unit 140 to that of its retracted state so as to adjust control member 156 to position C (see FIG. 6). In this regard, the effective length of piston unit 140 in its retracted state is also sufficient to adjust control member 156 to position C when the vehicle 200 is positioned at the target vehicle height.

In one embodiment, piston unit 140 is a dual-action pneumatic cylinder, and has connection means 160 and 180 removably connected thereto as described herein. In another embodiment, piston unit 140 is a single-action pneumatic cylinder, and has connection means 160 and 180 removably connected thereto as described herein, an example of which is illustrated in FIG. 6. In these embodiments, piston unit 140 together with connection means 160 and 180 removably connected thereto collectively measure 17½ inches in length when piston unit 140 is in its retracted state and 21½ inches in length when in its extended state. It is to be appreciated, however, that such length may be varied to facilitate the operations of the vehicle height control system 100 as implemented on various embodiments of vehicle 200.

The vehicle height control system 100 also includes a controller 30. Controller 30 may be configured to control the supply and discharge of the pressurized fluid to and from air springs 170 by controlling the control assembly 120 based on user input. More specifically, controller 30 may control the opening and closing of control valve 130, and the extension and retraction of piston unit 140 based on user input, which, in turn, controls the opening and closing of control valve 150.

Controller 30 includes a user interface. The user interface may be configured to receive and communicate user input indicative of a desired vehicle height adjustment operation. The user interface may embody, for example, any device(s) capable of receiving and communicating user input, such as a switch, knob, button, joysticks, radio-controller, a graphical interface device, or other interface devices known in the art. As illustrated in FIGS. 2, 3, and 6, in at least one embodiment, the user interface is embodied by an electric switch.

In some embodiments, controller 30 may also include software application components in communication with the user interface and with control valve 130. Software application components of controller 30 may be embodied by all hardware and software resources necessary for running a software program, including, for example, a memory device, such as a random access memory ("RAM") and/or read-only memory ("ROM"), a processing device, such as a central processing unit ("CPU"), and a software program stored in the memory device or other storage devices. Such software application components may be configured to receive user input from the user interface and to communicate control signals to control valve 130 based on the user input to affect the extension and retraction of piston unit 140 as appropriate to execute the desired vehicle height adjustment operation. More specifically, the user interface may be in communication with the processing device of such software application components via any signal transmission means suitable for communicating signals between the user interface and the processing device, including, for example, electrical wires, cables, satellite communication components, radio communication components, or Bluetooth communication components. The software program may include computer-readable instructions and/or data that determine the vehicle height adjustment operation desired by the user based on user input and relate the control of the control assembly 120 to the user input to execute the desired vehicle height adjustment operation. The user interface may receive user input indicative of a desired vehicle height adjustment operation and communicate a control signal particular to the user input to the processing device. Upon receipt, the processing device may process the control signal received from the user interface and reference the computer program stored in the memory device to determine the control signal to communicate to control valve 130 to induce control valve 130 to adjust to an appropriate state to execute the desired vehicle height adjustment operation. The processing device may then communicate the appropriate control signal to control valve 130 to induce control valve 112 to adjust to said state by which the appropriate passage configuration opens to direct pressurized fluid to or from the second inner chamber 146*b* of piston unit 140 as described herein, thereby inducing the extension or retraction of piston unit 140.

Controller 30 may be in communication with control valve 130 via signal transmission means 36 (such as electrical wires, cables, satellite communication components, radio communication components, or any other suitable means known in the art for communicating signals between controller 30 and control valve 130). User input is communicated to and received by control valve 130 in the form of control signals that correspond respectively to the various user inputs indicative of vehicle height adjustment operations described herein. Control signals may be transmitted in analog format, digital format, a combination thereof, or any other signal format recognized in the art as operable for transmission via signal transmission means 36. In one embodiment, for example, signal transmission means 36 is constituted by insulated copper wire(s), and the user interface is an electric switch that is electrically connected, via the insulated copper wires, to and between both control valve 130 and a power source 32 constituted by a battery. In such an exemplary embodiment, a user may open and close the electric switch to respectively communicate to control valve 130 an increase and decrease in an electric current generated by the battery, each of such variations in electric current signaling and inducing different adjustments of control valve 130 as appropriate to supply and discharge the pressurized fluid to and from piston unit 140 as described herein. In addition, in such an exemplary embodiment, a fuse 38 is preferably disposed between power source 32 and the controller 30 to prevent an undesired magnitude of electric current through the insulated copper wire(s), and the insulated copper wire(s) is or are preferably used to connect power source 32 to a ground source 40 to prevent undesired surges in the electric current output by power source 32.

A user may access the user interface of controller 30 from within an operation area of the primary vehicle 200*a*, such as the cab of the primary vehicle 200*a*. In this regard, controller 30 is configured to mount substantially within the operation area of the primary vehicle 200*a* such that the user interface may be accessed from the operation area. Controller 30 is configured to be so mounted by way of any suitable mounting means, such as chemical bonding agents (including adhesives), mechanical connectors (e.g., brackets, fasteners, and the like), and/or thermal bonding (such as melting and welding) with or without a separate bonding agent (e.g., a polymer with a low melting point).

In various embodiments, one or more alerting device(s) 34 may be in communication with the controller 30 to alert the user when the vehicle height control system 100 is increasing or maintaining the vehicle height to or at the target vehicle height. Alerting device(s) 34 are configured to output one or more perceivable signal(s), such as light, sound, and/or vibration, in response to a signal indicative of a vehicle height increase operation being communicated to control valve 130 through controller 30. Referring to the exemplary embodiment illustrated in FIG. 2, an alerting device 34 may embody, for example, an electrically-actuatable buzzer mounted in the cab of the primary vehicle 200*a* via any suitable means, including, for example, chemical bonding agents (including adhesives), mechanical connectors (e.g., brackets, fasteners, and the like), and/or thermal bonding (such as melting and welding) with or without a separate bonding agent (e.g., a polymer with a low melting point). In such an exemplary embodiment, alerting device 34 may be electrically connected to and between controller 30 and control valve 130 such that alerting device 34 activates when an electric current is communicated to control valve 130 through controller 30. When activated, alerting device 34 of such an exemplary embodiment outputs a sound perceivable by a user who is not otherwise disabled from perceiving the sound.

In some embodiments, controller 30 and control assembly 120 may be provided as a kit of parts for retrofitting the vehicle height control system 100 to an existing pressurized fluid suspension system of a vehicle including air springs, a pressurized fluid supply system, and a mechanically actuable valve interposed between the existing pressurized fluid supply system and the existing air springs operable to control the flow of pressurized fluid therebetween. The kit of parts includes: (a) piston unit 140 for actuating the mechanically actuable valve; (b) control valve 130 for controlling the supply and discharge of the pressurized fluid to and from piston unit 140; (c) connection means 160 and 180 for connecting piston unit 140 to the mechanically actuable valve and with an unsprung mass associated with an axle assembly 210 of the existing vehicle; (d) conduits 14 and 18*a* and fittings 42 for fluidically interconnecting piston unit 140 with an existing pressurized fluid supply system of the existing vehicle via control valve 130; (e) controller 30 for controlling control valve 130 and piston unit 140 based on user input; and (f) signal transmission means 36 for communicably connecting controller 30 and control valve 130. Alerting device 34 may also be provided in the kit of parts for alerting the user when the vehicle height is being increased to and/or maintained at the target vehicle height. Power source 32 may be provided in the kit of parts for providing a power output, such as an electric current, for performing various operations of the kit of parts. Mounting means, such as chemical bonding agents, mechanical connectors or any other suitable means known in the art, may be included in the kit of parts to facilitate mounting controller 30 substantially within an operation area of a primary vehicle such that the user interface can be accessed within such operation area. In one embodiment, the kit of parts includes piston unit 140 constituted by a single-action pneumatic cylinder, connection means 160 and 180 constituted respectively by the pivotal connection assembly and the fixed connection assembly described herein, control valve 130 constituted by a normally-closed, three-way solenoid valve, controller 30 constituted by an electric switch, conduits 14 and 18*a* made of ⅜ inch nylon tubing, ⅜ inch brass fittings 42, and signal transmission means 36 constituted by insulated copper wiring.

The vehicle height control system 100 of the present invention may be installed on a vehicle 200 during the manufacture of the vehicle 200. Alternatively, it is contemplated that an existing vehicle with a fluid suspension system, including air springs, a pressurized fluid supply system, and a mechanically-actuable valve for controlling the flow of pressurized fluid to and from those air springs, may be retrofitted with control assembly 120 and controller 30. For example, the kit of parts described herein may be retrofitted on such an existing vehicle such that it controls the supply and discharge of the pressurized fluid to and from air springs of such existing vehicle by controlling the opening and closing of the existing mechanically-actuable valve based on user input provided to the user interface of controller 30. For example, referring to FIGS. 4 and 6, connection means 160 and 180 may be connected to piston unit 140 and a fitting 42 may be connected to the first orifice 142*a* of piston unit body 142. Piston unit 140 may then be operably associated with an unsprung mass of the existing vehicle (such as an axle assembly of the existing vehicle) and the existing mechanically-actuable valve of such existing vehicle via connection means 160 and 180. Fittings 42 may be connected to the orifices 132*a* and 132*b* of control valve 130, and control valve 130 may be mounted to a vehicle body of such existing vehicle via any suitable connecting means, including, for example, chemical bonding agents (including adhesives), mechanical connectors (e.g., brackets, fasteners, and the like), welding, and/or thermal bonding (such as melting and welding) with or without a separate bonding agent (e.g., a polymer with a low melting point). Controller 30 may be mounted sufficiently within a cab of an existing primary vehicle of such existing vehicle via mounting means such that the user interface of controller 30 may be accessed within the cab of the existing primary vehicle. Signal transmission means 36 may be connected to power source 32, controller 30, and control valve 130 as appropriate for controller 30 to communicate signals to control valve 130 based on user input. A conduit 18*a* may be arranged and connected to the first orifice 142*a* of piston unit body 142 and piston unit orifice 132*b* of control valve 130 via fitting 42 such that piston unit 140 fluidically interconnects with control valve 130, and another conduit 18 may be arranged and connected to the supply orifice 132*a* of control valve 130 and an orifice of the existing pressurized fluid supply system via fittings 42 such that piston unit 140 fluidically interconnects with the existing pressurized fluid supply system of such existing vehicle via control valve 130. It is contemplated that a plurality of conduits may be provided or a sufficient length of unseparated conduit may be provided such that it can be separated into a plurality of conduits for fluidically interconnecting piston unit 140 to the existing pressurized fluid supply system 110 via control valve 130.

The operations of the vehicle height control system 100 will hereinafter be described with reference to FIGS. 4, 5, 6, 7A, and 7B. In general, the vehicle height control system 100 of the present invention is configured to perform at least two vehicle height adjustment operations: a vehicle height increase operation, and a vehicle height decrease operation. These vehicle height adjustment operations may include a plurality of steps executable by controller 30 and other components of the vehicle height control system. In describing the vehicle height increase operation of the vehicle height control system 100, it is to be understood that the pressure inside pressurized fluid supply reservoir 116 is sufficiently greater than the pressure inside air springs 170 so as to enable the pressurized fluid to travel toward air springs 170 when control valve 150 is in its first open state, and is sufficiently greater than the forces acting on piston 144*b* inside the first inner chamber 146*a* of piston unit 140 to displace piston 144*b* toward the first end 146*c* of the inner chamber 146 when supplied to the second inner chamber 146*b* of piston unit 140. In describing the vehicle height decrease operation, it is to be understood that the pressure beneath piston 144*b* inside the inner chamber 146 of piston unit 140 is sufficiently greater than that of the atmosphere so as to enable the pressurized fluid inside the second inner chamber 146*b* to discharge into the atmosphere when the discharge passage configuration of control valve 130 is open, and that the pressure inside air springs 170 is sufficiently greater than that of the atmosphere so as to enable the pressurized fluid in air springs 170 to discharge into the atmosphere when the discharge passage configuration of control valve 150 is open.

The vehicle height increase operation of the vehicle height control system 100 will be described with reference to FIGS. 4, 5, 7A, and 7B. Immediately prior to executing the vehicle height increase operation, the vehicle 200 is preferably maintained at the standard vehicle height by the vehicle height control system 100. In particular, control valve 150 is maintained in its closed state such that the pressurized fluid is not supplied to or discharged from air springs 170. To initiate the vehicle height increase operation, the user performs step 46 shown in FIGS. 7A and 7B by providing user input to the user interface of controller 30 indicative of a vehicle height increase operation (such as closing the electric switch of the exemplary embodiment illustrated in FIG. 2). Upon receiving such user input, controller 30 communicates a signal based on user input (an increase in electric current, for example) to control valve 130 that induces performance of a vehicle height increase operation, as indicated in step 48 of FIGS. 7A and 7B. More specifically, as indicated in steps 50 and 52 of FIGS. 7A and 7B, upon receipt of and in response to the signal, control valve 130 adjusts such that the supply passage configuration of control valve 130 opens, allowing the pressurized fluid from the pressurized fluid supply system 110 to be supplied to the second inner chamber 146*b* of piston unit 140 through the first passage 19*a* formed inside piston unit body 142.

Figure 7B:
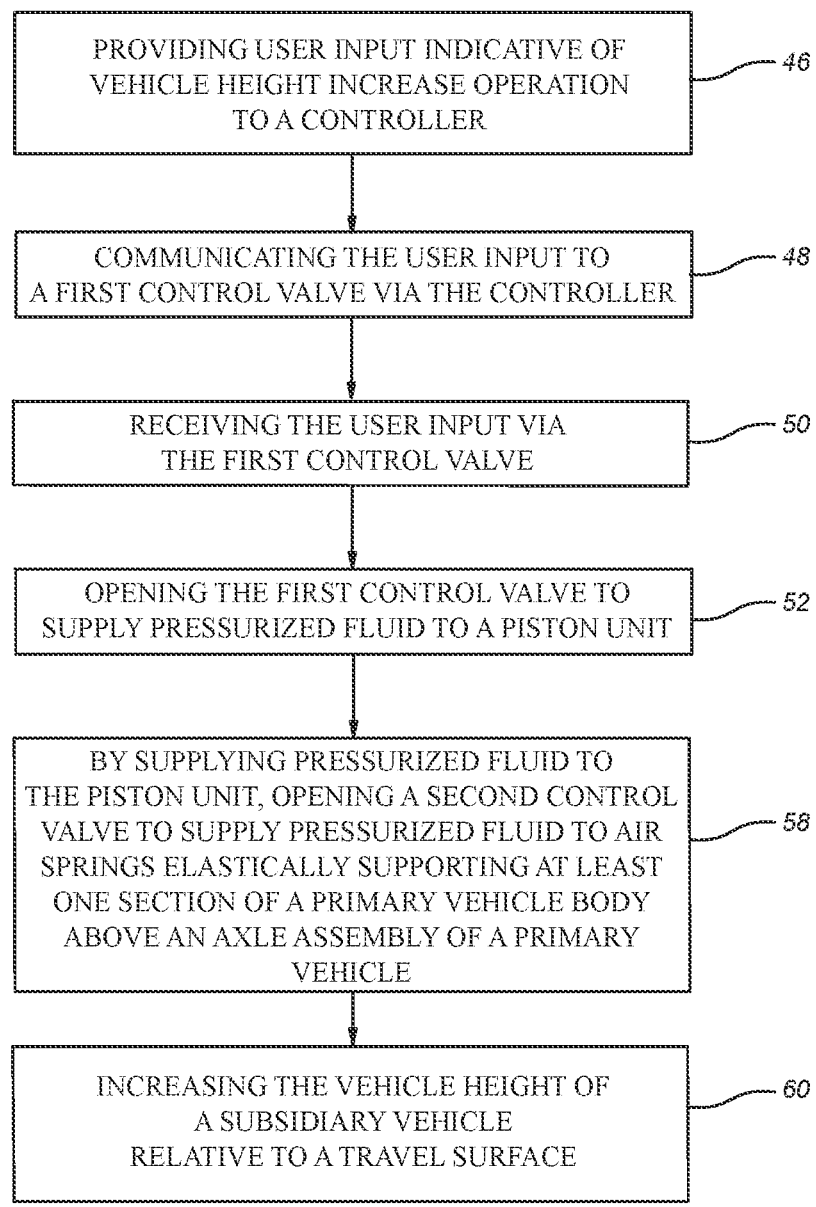
FIG. 7B is a flowchart of a second exemplary vehicle height increase operation.

As the pressurized fluid is supplied to the second inner chamber 146*b*, the pressure beneath piston 144*b* increases so as to displace piston 144*b* toward the first end 146*a* of the inner chamber 146, causing piston rod 144*a* to increasingly extend outward from the first end 142*c* of piston unit body 142 to perform step 54 of FIG. 7A and/or step 58 of FIG. 7B. Namely, in response to the extension of piston rod 144*a*, control member 156 is adjusted in a first direction to position B so as to place control valve 150 in its first open state in which the supply passage configuration of control valve 150 is open. Upon opening the supply passage configuration of control valve 150, the pressurized fluid from the pressurized fluid supply system 110 is supplied to air springs 170 through control valve 150 to commence step 56 of FIG. 7A and/or step 60 of FIG. 7B (depending on the manner in which air springs 170 are provided and the configuration of vehicle 200). Air springs 170, accordingly, expand vertically, causing the vehicle height to increase. As the vehicle height increases, piston unit 140 remains in its extended state with a constant effective length, and, in response, control member 156 will gradually adjust in a second direction toward position A such that control valve 150 is gradually reverted to its closed state, finally reaching its closed state upon the target vehicle height being obtained in conclusion of step 56 of FIG. 7A and/or step 60 of FIG. 7B. Once the target vehicle height is obtained, therefore, air springs 170 cease expanding. While the vehicle is positioned at the target vehicle height, without contrary user input being provided to the user interface of controller 30, piston unit 140 remains in its extended state such that control member 156 is maintained in position A by which control valve 150 is maintained in its closed state. The target vehicle height is thereby maintained until otherwise displaced pursuant to a vehicle height decrease operation or in response to an intervening force (a load applied on top of the vehicle body 220 causing a sudden downward displacement of the vehicle height, for example).

As noted, the manner in which air springs are provided, and the configuration of a particular embodiment of vehicle 200, determine whether step 56 of FIG. 7A and/or step 60 of FIG. 7B is commenced in response supplying air springs 170 with the pressurized fluid. More specifically, both step 56 of FIG. 7A and step 60 of FIG. 7B may be commenced when, for example, one or more air springs 170 are provided to elastically support a section of the primary vehicle body to which a subsidiary vehicle 200b connects. Step 56 of FIG. 7A may be solely commenced, for example, when no subsidiary vehicle 200b is connected to primary vehicle 200a or when air springs 170 are provided to elastically support one or more sections of the primary vehicle body that is not connected to the subsidiary vehicle 200b, provided that the primary vehicle 200a is configured such that an adjustment in the vehicle height with respect to such section(s) does not induce an adjustment of the vehicle height of the subsidiary vehicle 200b.

The vehicle 200 is intended to be operated while positioned at the vehicle target height to perform certain tasks for which a vehicle height above the standard vehicle height is desired. For example, the vehicle 200 may be operated at the target vehicle height when navigating over an uneven ground surface or transitioning to a sharply-inclined ground surface, including, for example, railroad crossings and sharply-inclined driveways. The vehicle height control system 100 may therefore be particularly useful when, for example, the standard vehicle height of the vehicle 200 is of such short distance above the ground surface that the undercarriage of the vehicle body 220 is susceptible to damage from striking such ground surfaces.

The target vehicle height is determined via testing and the like such that it is above the standard vehicle height, but does not render the vehicle 200 inoperable for normal transportation operations due to over manipulating the driveline angles of the vehicle 200. Although the driveline angles of the vehicle 200 may be capable of normal transportation operations while the vehicle 200 is positioned at the target vehicle height, the vehicle 200 is preferably reverted to the standard vehicle height when used for normal transportation operations. Vehicle 200 may be reverted from the target vehicle height to the standard vehicle height by performing the vehicle height decrease operation of the vehicle height control system 100.

The vehicle height decrease operation of the vehicle height control system 100 of the present invention will be described with reference to FIGS. 4 and 6. Immediately prior to executing the vehicle height decrease operation, the vehicle height is preferably maintained at the target vehicle height. To initiate the vehicle height decrease operation, the user provides user input to the user interface of controller 30 that is indicative of a vehicle height decrease operation (opening the electric switch of the exemplary embodiment illustrated in FIG. 2, for example). Upon receiving such user input, controller 30 communicates a corresponding signal (such as a decrease in electric current) to control valve 130 to induce performance of a vehicle height decrease operation. When control valve 130 receives the signal to perform a vehicle height decrease operation, control valve 130 adjusts such that its discharge passage configuration opens, allowing the pressurized fluid inside the inner chamber 146 and beneath piston 144b of piston unit 140 to be discharged into the atmosphere through the discharge orifice 132c of control valve 130.

As the pressurized fluid is discharged from the inner chamber 146 of piston unit 140 into the atmosphere, piston 144b is displaced toward the second end 146d of the inner chamber 146. As piston 144b is displaced toward the second end 146d of the inner chamber 146, piston rod 144a gradually retracts within the inner chamber 146. In response to the retraction of piston unit 140, control member 156 is adjusted in the second direction to position C so as to adjust control valve 150 to its second open state in which the discharge passage configuration of control valve 150 is open. Upon opening the discharge passage configuration of control valve 150, the pressurized fluid inside air springs 170 discharges into the atmosphere. As the pressurized fluid from air springs 170 discharges into the atmosphere, air springs 170 contract vertically, causing the vehicle height to decrease to the standard vehicle height. As the vehicle height decreases to the standard vehicle height, piston unit 140 remains in its retracted state with a constant effective length, and, in response, control member 156 will gradually adjust in the first direction toward position A such that control valve 150 is gradually reverted to its closed state, finally reaching its closed state upon the target vehicle height being obtained. Once the target vehicle height is obtained, therefore, air springs 170 cease contracting. While the standard vehicle height is maintained, without contrary user input being provided to controller 30, piston unit 140 remains in its retracted state such that control member 156 is maintained in position A by which control valve 150 is maintained in its closed state while the vehicle 200 is positioned at the standard vehicle height. The standard vehicle height is thus maintained until otherwise displaced pursuant to a vehicle height increase operation or in response to an intervening force (such as a load applied on top of the vehicle body 220 causing a sudden downward displacement of the vehicle height).

FIG. 1 illustrates an exemplary primary vehicle 200a of a semi-truck and an exemplary subsidiary vehicle 200b of a trailer connected thereto. The vehicle height control system 100 of the present invention may be useful when used in connection with a semi-truck with a trailer connected thereto, particularly when the trailer is configured such that its load-carrying platform is a short distance above the ground surface when the semi-truck and trailer are positioned at the standard vehicle height relative to the ground surface. Trailers configured in such a manner are commonly used in the trucking industry for hauling heavy objects. Although the low positioning of the load-carrying platform of the trailer renders loading heavy objects onto the load-carrying platform easier, the undercarriage of the load-carrying platform is susceptible to damage when traveling over many common uneven surfaces or transitioning to sharply-inclined surfaces.

FIG. 3 illustrates, among other things, a top view of an exemplary axle assembly 210 of an exemplary primary vehicle 200a of a semi-truck. Referring to FIG. 1 and FIG. 3, the vehicle height control system 100 may be implemented on a semi-truck such that air springs 170 elastically support a rear section R1 of the primary vehicle body of the semi-truck above a rear axle assembly 210 of the semi-truck. A trailer may be connected to the semi-truck in a conventional manner such that a front section F2 of the trailer is positioned above or substantially above the rear axle assembly 210 of the semi-truck. When the user approaches a railroad crossing while driving the semi-truck with the trailer connected thereto, prior to crossing, the user may provide user input to the user interface of controller 30 that corresponds to a vehicle height increase operation, whereby controller 30 will signal control valve 130 to execute a vehicle height increase operation. The vehicle height control system 100 will accordingly execute the vehicle height increase operation, whereby the vehicle height of a rear section R1 of the primary vehicle body of the semi-truck will increase to the target vehicle height. In response, the vehicle height of the front section F2 of the trailer positioned above the rear axle assembly 210 will increase to the target vehicle height, causing the trailer to tilt in a backwards direction. This tilting of the trailer will increase the vehicle height of its load-carrying platform descendingly from the front section F2 to the back section R2 thereof. Once the target vehicle height of the semi-truck and trailer is obtained, the user may navigate the semi-truck and trailer over the railroad crossing without the undercarriage of the trailer striking the surface of the railroad crossing. After crossing the railroad crossing, the user may provide user input indicative of the vehicle height decrease operation to the user interface of controller 30 by which the vehicle height decrease operation will be executed, reverting the semi-truck and trailer to the standard vehicle height.

The principles, preferred embodiment, and mode of operation of the present invention have been described in this specification. All references cited in this specification are hereby incorporated by reference insofar as there is no inconsistency with the disclosure of this specification. In interpreting this specification, all of the terms used to describe the present invention should be given the broadest interpretation consistent with the context. For example, terms that connote the singular, such as "an," "a," and "the," shall also connote the plural unless the context clearly indicates otherwise. The terms "comprises," "comprising," "includes," "including," and "having," are inclusive and therefore specify the presence of stated features, integers, steps, elements, operations, and/or components, but do not preclude the presence or absence of other features, integers, steps, elements, operations, components, and/or groups thereof. The conjunctive term "and/or," or terms of similar import, shall be understood to be inclusive of any and all combinations of the items listed in connection with such term. Ordinal numbers, such as "first," "second," and "third," are used to distinguish between various constituent elements for convenience and do not denote the order of constituent elements so distinguished. Further, directional terms, such as "top," "bottom," "upper," "lower," "left," "right," "upward," and "downward," are used to clarify and describe the relationship between various constituent elements of specific embodiments of the present invention, but do not denote absolute orientation. Therefore, such terms may vary according to the orientation of the present invention. In addition to the foregoing terminological considerations, specific embodiments referenced in describing the present invention are not to be regarded as exhaustive or as limiting to the full scope of the present invention, as defined in the claims. Other persons may modify the disclosed embodiments, or employ equivalents thereof, without departing from the scope and spirit of the present invention as defined in the claims. Accordingly, all of such modifications and equivalents are expressly intended to be embraced by the claims.

I hereby claim the following:

1. A vehicle height control system, comprising:
   a. a pressurized fluid supply system configured to supply a pressurized fluid;
   b. a plurality of air springs provided to elastically support at least one section of a vehicle body of a vehicle above at least one axle assembly of the vehicle and configured to adjust a vehicle height of the vehicle in response to the supply and discharge of the pressurized fluid;
   c. a control assembly formed by a piston unit fluidically interconnected with the pressurized fluid supply system via a first control valve;
   d. a second control valve that is interposed between and fluidically interconnected with the pressurized fluid supply system and the air springs, and is configured to control the supply and discharge of the pressurized fluid to and from the air springs in response to the control assembly; and
   e. a controller configured to receive user input and to adjust the vehicle height by controlling the control assembly based on the user input.

2. The vehicle height control system of claim 1, wherein the second control valve comprises a valve element movably embedded inside a valve body, and a control member operably associated with the valve element to control the supply and discharge of the pressurized fluid to and from the air springs in response to the piston unit of the control assembly.

3. The vehicle height control system of claim 2, wherein the second control valve is connected to the vehicle body, and wherein the piston unit is connected to an axle assembly of the vehicle and positioned substantially beneath the second end of the control member of the second control valve.

4. The vehicle height control system of claim 3, wherein the piston unit comprises a piston unit body defining an inner chamber, and a piston assembly movably disposed substantially within the inner chamber.

5. The vehicle height control system of claim 4, wherein the piston unit body is connected to the axle assembly of the vehicle, and the piston assembly has a piston rod that is configured to extend outwardly from the piston unit body and is pivotally connected to the second end of the control member of the second control valve.

6. The vehicle height control system of claim 5, wherein the pressurized fluid is pressurized air and wherein the piston unit is a pneumatic cylinder.

7. The vehicle height control system of claim 6, wherein the piston unit further comprises a spring disposed within the inner chamber of the piston unit body and configured to apply a force on the piston of the piston assembly.

8. The vehicle height control system of claim 1, wherein the vehicle comprises a primary vehicle and a subsidiary vehicle connected to the primary vehicle, each of which separately have at least one axle assembly, and wherein the vehicle body comprises a primary vehicle body of the primary vehicle and a subsidiary vehicle body of the subsidiary vehicle.

9. The vehicle height control system of claim 8, wherein the air springs are provided to elastically support at least one section of the primary vehicle body above the at least one axle assembly of the primary vehicle.

10. The vehicle height control system of claim 8, wherein the air springs are provided to elastically support at least one section of the subsidiary vehicle body above the at least one axle assembly of the subsidiary vehicle.

11. The vehicle height control system of claim 1, wherein the vehicle height control system is configured to adjust the vehicle height of at least one section of the vehicle body to a position of at least four inches above a standard vehicle height of the at least one section of the vehicle body elastically supported by the air springs.

12. A method of using the vehicle height control system of claim 1 to increase the vehicle height of the vehicle relative to a ground surface, wherein the method comprises the steps of:
   a. providing user input indicative of a vehicle height increase operation to the controller within an operation area of a primary vehicle;

b. communicating the user input, via the controller, to the first control valve;
c. receiving the user input via the first control valve;
d. based on the user input, said first control valve opening to supply the pressurized fluid to the piston unit;
e. by supplying the pressurized fluid to the piston unit by opening the first control valve, opening the second control valve to supply the pressurized fluid to the air springs that elastically support the at least one section of the vehicle body above the at least one axle assembly of the vehicle; and
f. increasing the vehicle height of the vehicle relative to the ground surface by supplying the pressurized fluid to the air springs.

13. The method of claim 12, wherein the method further comprises the step of increasing the vehicle height of the vehicle according to step (f) until the vehicle height of the vehicle is positioned at least four inches above a standard vehicle height of the vehicle.

14. A method of using the vehicle height control system of claim 8 to increase the vehicle height of the subsidiary vehicle relative to a ground surface, wherein the method comprises the steps of:
   a. providing user input indicative of a vehicle height increase operation to the controller within an operation area of the primary vehicle;
   b. communicating the user input, via the controller, to the first control valve;
   c. receiving the user input via the first control valve;
   d. based on the user input, said first control valve opening to supply the pressurized fluid to the piston unit;
   e. by supplying the pressurized fluid to the piston unit by opening the first control valve, opening the second control valve to supply the pressurized fluid to the air springs that elastically support at least one section of the primary vehicle body above the at least one axle assembly of the primary vehicle; and
   f. increasing the vehicle height of the subsidiary vehicle relative to the ground surface by supplying the pressurized fluid to the air springs.

15. The method of claim 14, wherein the method further comprises the step of increasing the vehicle height of the subsidiary vehicle according to step (f) until the vehicle height of the subsidiary vehicle is positioned at least four inches above a standard vehicle height of the subsidiary vehicle.

16. A kit of parts for retrofitting a vehicle height control system to a pressurized fluid suspension system of a vehicle, the pressurized fluid suspension system including air springs, a pressurized fluid supply system, and a mechanically actuable valve interposed between the air springs and the pressurized fluid supply system, the kit comprising:
   a. a piston unit for actuating the mechanically actuable valve to supply and discharge a pressurized fluid to and from the air springs;
   b. connection means for connecting the piston unit to the mechanically actuable valve and an axle assembly of the vehicle;
   c. a control valve for controlling the supply and discharge of the pressurized fluid to and from the piston unit;
   d. at least one conduit and fittings for fluidically interconnecting the piston unit with the pressurized fluid supply system via the control valve;
   e. a controller for receiving user input and controlling the control valve based on the user input; and
   f. signal transmission means for communicably connecting the controller and the control valve.

17. The kit of claim 16, wherein the control valve comprises a solenoid valve.

18. The kit of claim 17, wherein the controller comprises an electric switch.

19. The kit of claim 18, wherein the kit further comprises mounting means for mounting the controller to the vehicle.

20. The kit of claim 19, wherein the kit further comprises an alerting device to alert the user.

* * * * *